US008396040B2

(12) United States Patent
Song et al.

(10) Patent No.: US 8,396,040 B2
(45) Date of Patent: Mar. 12, 2013

(54) SYSTEMS, METHODS, AND DEVICES TO ENABLE SELECTION OF RADIO ACCESS TECHNOLOGY

(75) Inventors: Osok Song, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 12/763,000

(22) Filed: Apr. 19, 2010

(65) Prior Publication Data

US 2010/0265914 A1   Oct. 21, 2010

Related U.S. Application Data

(60) Provisional application No. 61/170,997, filed on Apr. 20, 2009.

(51) Int. Cl.
*H04W 4/00* (2009.01)
*H04W 36/00* (2009.01)

(52) U.S. Cl. .................. 370/331; 455/436
(58) Field of Classification Search .................. None
See application file for complete search history.

(56) References Cited

U.S. PATENT DOCUMENTS

2008/0268818 A1* 10/2008 Keller et al. ............ 455/414.1
2010/0034166 A1*  2/2010 Olvera-Hernandez ...... 370/331

FOREIGN PATENT DOCUMENTS

WO  WO 2008145610   12/2008

OTHER PUBLICATIONS

MobileIGNITE MoU Industry Group: "Voice Call Handover Service: Functional Specification Version 1.0", Sep. 21, 2006.*

Ericsson: ,, RAN2 functionality for CS fallback 3GPP Draft; R2-082928_RAN2_Impacts_of_CSFallback, 3rd Generation Partnership Project (3GPP), Mobile Competence Centre ; 650, Route Des Lucioles ; F-06921 Sophia-Antipolis Cedex ; France, vol. RAN WG2, no. Sophia Antipolis, France; 20080601, Jun. 1, 2008, XP050142121 [retrieved on Jun. 1, 2008] p. 2-p.4, paragraph 4.
International Search Report and Written Opinion—PCT/US2010/031784, International Search Authority—European Patent Office—Aug. 4, 2010.
Mobile Ignite: "Voice Call Handover Service: Functional Specification Version 1.0 Interoperability Group Best Practices—MI-IOG-HO-Z00e-OO1-VI.0" Internet Citation Sep. 21, 2006, XP007902862 Retrieved from the Internet: URL:http://www.mobilei gni te.org/documents/ MobileIGNITE__Handover_FS_vi.0.doc [retrieved on Aug. 30, 2007] p. 4, paragraph 1 p. 19, paragraph 7.4—p. 21, paragraph 7.6.
QUALCOMM Europe. "Discussion: Connecting to a PLMN that provides both CS and PS services versus connecting to the highest priority available PLMN" 3GPP Draft;CI-083887.
3rd Generation Partnership Project (3GPP), Mobile Competence Centre : 650, Route Des Lucioles : F-06921 Sophia-Antipolis Cedex ; France, no. Phoenix; 20081013, Oct. 13, 2008, XP050309023 [retrieved on Oct. 13, 2008] the whole document.

* cited by examiner

*Primary Examiner* — Clemence Han
(74) *Attorney, Agent, or Firm* — Florin Corie; Kam T. Tam

(57) ABSTRACT

In some embodiments, an access terminal is configured to select a first set of system resources, and communicate a message to acquire access to the first set of system resources, wherein the message conceals that the access terminal is capable of communication with a second set of system resources. In one embodiment, the first set of system resources includes circuit-switched system resources, the second set of system resources includes packet-switched system resources, and an access terminal conceals from the network that it is operable using the packet-switched system resources in order to acquire and/or maintain connected mode access to the circuit-switched system resources. Such embodiments allow an access terminal to use circuit-switched system resources even if the network does not support CS fallback or has refused a CS fallback request.

44 Claims, 18 Drawing Sheets

SYSTEMS, METHODS, AND DEVICES TO ENABLE SELECTION OF RADIO ACCESS TECHNOLOGY

CLAIM OF PRIORITY UNDER 35 U.S.C. §119

The present Application for Patent claims priority to U.S. Provisional Application No. 61/170,997, entitled "METHOD AND APPARATUS TO ENABLE SELECTION OF RADIO ACCESS TECHNOLOGY SUPPORTING PREFERRED SERVICE IN CONNECTED MODE," filed Apr. 20, 2009. The above-referenced application is hereby expressly incorporated by reference herein.

BACKGROUND

1. Field

The present application relates to wireless communication, and more specifically to systems, methods and devices to enable management of wireless network resources.

2. Background

Wireless communication systems employing packet-switched technology are widely deployed to provide various types of communication, such as, for example, voice, data, multimedia services, etc. Growing demand for high-rate wireless data services continues to drive the migration towards packet-switched technology. Yet as the demand for high-rate wireless data services grows, there lies a challenge to provide access to circuit-switched system resources, which are preferred by some users for voice service.

Packet-switched networks and system resources are based on the long-term evolution ("LTE") standards or similar technology, which were developed to be the next generation of wireless networks. However, the deployment of packet-switched networks and system resources has occurred piecemeal and in isolated pockets, often within previously available circuit-switched networks. Consequently, some wireless networks contain both packet-switched and circuit-switched system resources. Some users prefer the quality of service (QoS) for voice service on circuit-switched systems resources over the QoS for voice service on packet-switched system resources provided by the same wireless network carrier. As a result, some wireless network carriers support a scheme known as circuit-switched (CS) fallback. CS fallback allows mobile devices or other types of user equipment to send a message to the network controller requesting access to circuit-switched system resources for voice service. The decision to provide access to circuit-switched system resources upon request from user equipment is within the sole control of the network controller. Accordingly, a CS fallback request can be denied even if CS fallback is generally supported by the network. Some wireless network carriers do not support CS fallback schemes at all, even though circuit-switched system resources are available. In other words, user equipment operable on packet-switched system resources is denied access to available circuit-switched system resources by some wireless network carriers. Enabling the selection a radio access technology associated with a preferred service is desirable.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to manage wireless network resources at base stations and/or femto nodes.

One aspect of the disclosure is a method of selecting wireless communication service, including: selecting a first set of system resources; and communicating a message to acquire access to the first set of system resources, wherein the message conceals that an access terminal is capable of communication with a second set of system resources. In one embodiment, the method also includes autonomously releasing a connection associated with the second set of system resources. In one embodiment, the method also includes requesting registration to the first set of system resources via the second set system of resources for access to a particular type of preferred service; and receiving a refusal for registration to the first set of system resources via the second set of system resources for the particular type of preferred service.

In one embodiment, the first set of system resources predominantly includes circuit-switched network elements, and the second set of system resources predominantly includes packet-switched network elements. In one embodiment, the second set of system resources is a carrier. In one embodiment, the first set of system resources constitutes part or all of a system provided by a carrier different from the carrier associated with the second set of system resources. In one embodiment, the first set of system resources is provided by a carrier of a system using a different radio access technology from the second set of system resources. In one embodiment, the first set of system resources includes circuit-switched network elements provided by at least one of UTRAN and GERAN, and the second set of system resources includes packet-switched network elements provided by E-UTRAN. In one embodiment, preventing transfer back to the second set of system resources is based on network knowledge of the second set of system resources not being able to provide the preferred service.

One aspect of the disclosure is a device including: a transceiver configured to transmit and receive wireless signals; a controller; and non-transitory computer readable memory storing code that when executed by the controller is configured to communicate a message using the transceiver to acquire access to a first set of system resources, wherein the message conceals that an access terminal is capable of communication with a second set of system resources. In one embodiment, the non-transitory computer readable memory further comprises code that when executed by the controller is configured to autonomously release a connection associated with the second set of system resources. In one embodiment, the non-transitory computer readable memory further comprises code that when executed by the controller is configured to: request registration to the first set of system resources via the second set system of resources for access to a particular type of preferred service; and receive a refusal for registration to the first set of system resources via the second set of system resources for the particular type of preferred service.

In one embodiment, the first set of system resources predominantly includes circuit-switched network elements, and the second set of system resources predominantly includes packet-switched network elements. In one embodiment, the non-transitory computer readable memory further comprises code that when executed by the controller is configured to determine that the second set of system resources does not provide the preferred service, wherein the determination of non-availability of preferred service is based on a failed registration onto the network domain that the preferred service is associated with, and wherein the first set of system resources provides a preferred service associated with a particular type of network domain.

One aspect of the disclosure is a machine readable medium having machine executable instructions stored thereon, that when executed by a computing device are configured to communicate a message using the transceiver to acquire access to a first set of system resources, wherein the message conceals that an access terminal is capable of communication with a second set of system resources. In one embodiment, the machine readable medium also includes machine executable instructions stored thereon, that when executed by a computing device are configured to autonomously release a connection associated with the second set of system resources. In one embodiment, the machine readable medium includes machine executable instructions stored thereon, that when executed by a computing device are configured to determine that the second set of system resources does not provide the preferred service, wherein the determination of non-availability of preferred service is based on a failed registration onto the network domain that the preferred service is associated with, and wherein the first set of system resources provides a preferred service associated with a particular type of network domain.

One aspect of the disclosure is a device including: means for selecting a first set of system resources; and means for communicating a registration message to acquire access to the first set of system resources, wherein the registration message conceals that an access terminal is capable of communication with a second set of system resources.

Figure 1:
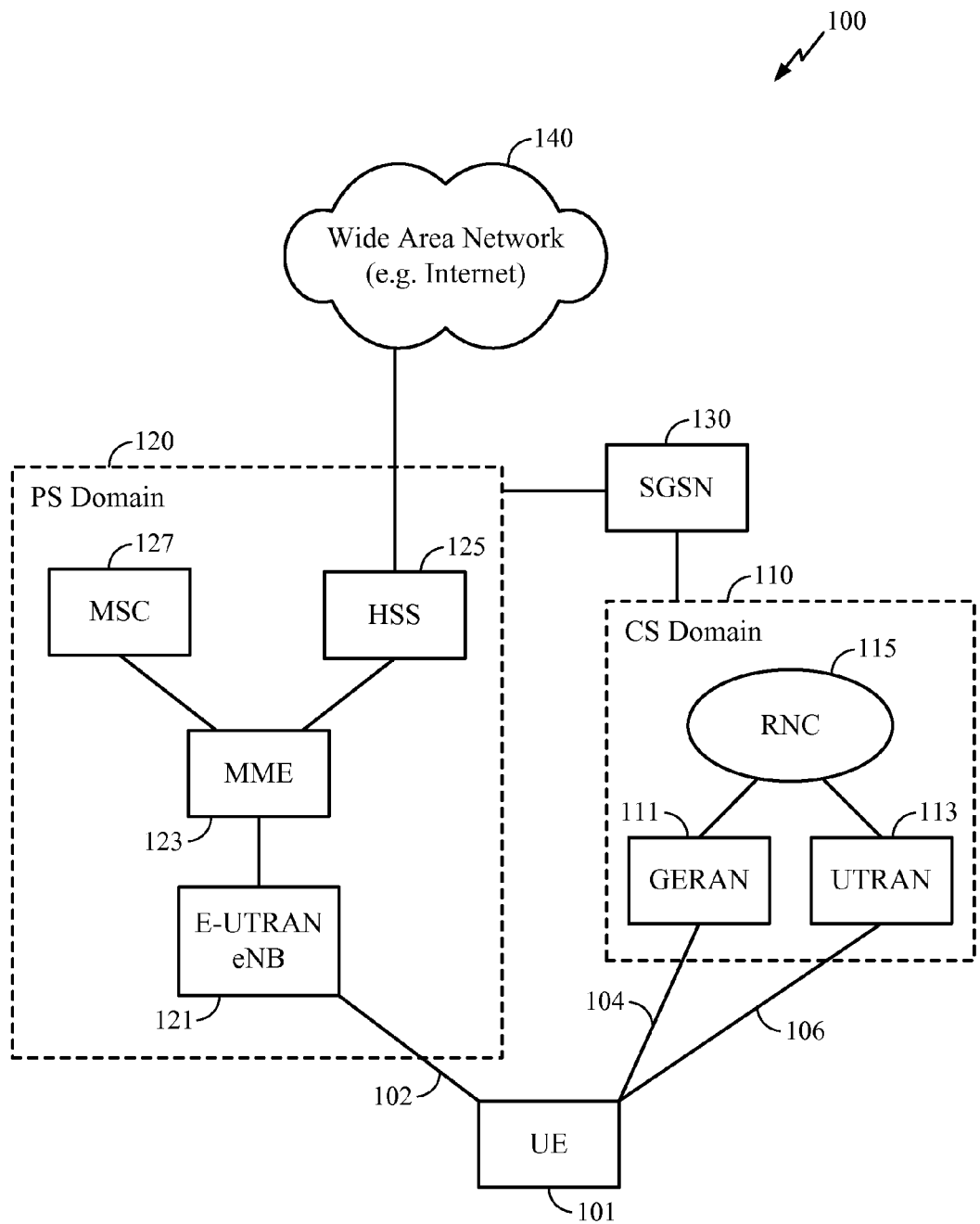
FIG. 1 is a simplified block diagram of several sample aspects of a communication system including packet-switched and circuit-switched system resources.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Moreover, the word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3 G networks, typically referred to as a macro cell network) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

FIG. 1 is a simplified block diagram of several sample aspects of a communication system 100 (e.g., a portion of a communication network) including packet-switched and circuit-switched network resources. Those skilled in the art will appreciate that a wireless network is more complex than the simplified system 100 illustrated in FIG. 1. Accordingly, the system 100 as illustrated only contains those components useful for describing some prominent features of embodiments within the scope of the claims. Moreover, for illustrative purposes only, various aspects of embodiments will be described in the context of one or more network nodes, access points, and access terminals that communicate with one another. It should be appreciated, however, that the description herein may be applicable to other types of apparatus or other similar apparatuses that are referenced using other terminology.

The system 100 includes a circuit-switched (CS) domain 110, a packet-switched (PS) domain 120, and a serving GPRS (general packet radio service) supporting node (SGSN) 130. The SGSN 130 bridges management of communication between the CS domain 110 and the PS domain 120. The system 100 also includes user equipment (UE) 101. While only one UE 101 has been illustrated in FIG. 1, those skilled in the art will appreciate that an LTE system may include any number of access terminals, mobile devices, UEs and the like.

Those skilled in the art will also appreciate that a CS domain of a wireless network is more complex than the simplified CS domain 110 illustrated in FIG. 1. Accordingly, the CS domain 110 illustrated in FIG. 1 only contains those components useful for describing some prominent features of embodiments within the scope of the claims. The CS domain 110 includes a radio network controller (RNC) 115, a GSM EDGE radio access network (GERAN) node 111 and a UMTS Terrestrial Radio Access Network (UTRAN) node 113.

In operation, the RNC 115 is in communication with the GERAN node 111 and the UTRAN node 113. The RNC 115 serves to manage circuit-switched system resources according to established rules within the wireless network 100. As described in further detail below, the RNC 115 in conventional systems is forced to transfer operating user equipment (UE) from the CS domain 110 to the PS domain 120, by signaling through the SGSN 130 in accordance with system rules, so long as a UE is capable of operating within the PS domain 120. That is, the CS domain 110 of a conventional system will deny access to a UE 101 that is equipped to operate in the PS domain 120.

Those skilled in the art will also appreciate that a PS domain of a wireless network is more complex than the simplified PS domain 120 illustrated in FIG. 1. Accordingly, the PS domain 120 illustrated in FIG. 1 only contains those components useful for describing some prominent features of embodiments within the scope of the claims. The PS domain 120 includes an evolved-UTRAN (E-UTRAN) node 121 configured according to LTE or a similar technology. The PS domain 120 also includes a mobility management entity (MME) 123, a home subscriber server (HSS) 125, and a mobile switching center (MSC) 127.

The HSS 125 connects the PS domain 120 to a wide area network 140 (e.g. Internet and/or private network). The HSS 125 is also in communication with the MME 123, which is in turn in communication with the E-UTRAN node 121. The MSC 127 is also in communication with the MME 123. While only one MME 123 has been illustrated in FIG. 1, those skilled in the art will appreciate that an LTE system may include any number of MME nodes. Similarly, those skilled in the art will also appreciate that an LTE system may include any number of E-UTRAN nodes.

The wide area network 140 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the wide area network 140 includes network variations such as the public Internet, a private network within the Internet, a secure network within the Internet, a private network, a public network, a value-added network, an intranet, and the like. In certain embodiments, wide area network 140 may also comprise a virtual private network (VPN).

In operation, the MSC 127 manages the operation of the MME 123, which in turn manages the E-UTRAN nodes (e.g. E-UTRAN 121). Specifically, the MSC 127 is used to set and enforce the rules of the system 100, including whether or not to support CS fallback.

The UE 101 may be equipped to access and operate with system resources within the PS domain only 120, the CS domain only 110 or both. If the UE 101 is equipped to access and operate with system resources within both the CS domain 110 and the PS domain 120, the system 100 may be configured to favor communication within the PS domain 120. The MSC 127 enforces that favoritism, by forcing user equipment (e.g. UE 101) to use the PS domain 120, unless the user equipment is not equipped to do so. That is, in a conventional system a UE that can operate on the PS domain 120 is transferred to the PS domain 120, even if the UE is initially connected to system resources within the CS domain 110. For example, if the UE 101 establishes communications links 104 or 106 to the GERAN node 111 or the UTRAN node 113, respectively, prior to establishing a communication link to the PS domain 120, the system will operate to transfer the UE 101 to the PS domain 120. Effectively, the system 100 will force the UE 101 to establish a communication link 102 with the E-UTRAN node 121.

However, some users prefer the quality of service (QoS) for voice service in the CS domain 110 over the QoS for voice service in the PS domain 120 provided within the same system 100. As a result, some wireless network carriers support CS fallback. CS fallback allows mobile devices or other user equipment to send a message to the network controller (e.g. MSC 127 via the E-UTRAN 121) requesting access to circuit-switched system resources for voice service. The decision to provide access circuit-switched system resources upon request is solely within the control of the network controller (e.g. MSC 127) of the carrier.

For example, if the system 100 does not support CS fallback, the UE 101 will be forced to use PS domain 120 system resources for communication and data transfer. In other words, the UE 101 will be denied access to the CS domain 110, even though it is available and operating. However, if the system 100 does support CS fallback, the UE 101 can request to use CS domain 110 system resources for voice service. Accordingly, the UE 101 will be permitted to establish at least one of the communication links 104, 106 with the GERAN node 111 or the UTRAN 113 node, respectively. However, a CS fallback request can be denied even if CS fallback is generally supported by the system 100.

Figure 2:
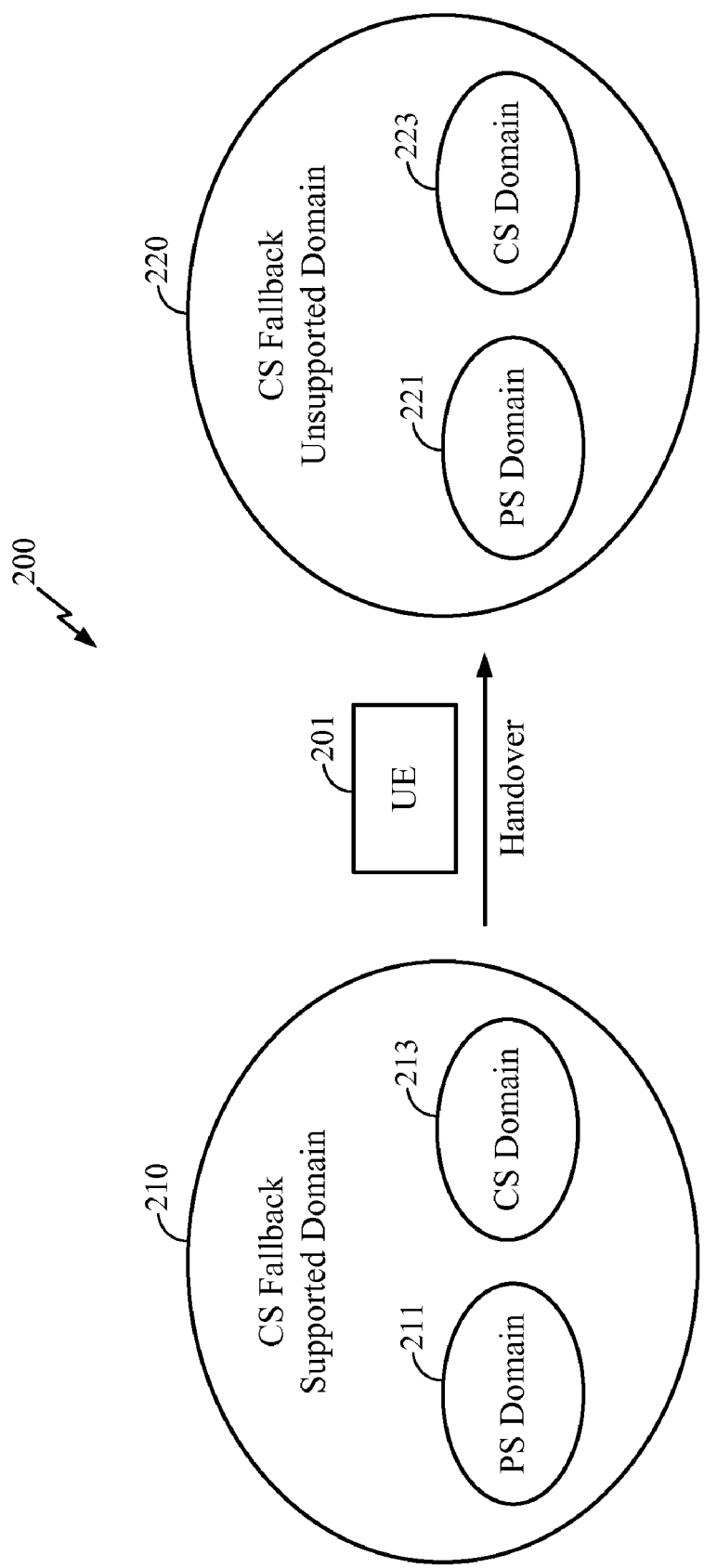
FIG. 2 is a simplified block diagram illustrating a handover operation between two network domains utilizing different operating schemes.

The challenge of accessing circuit-switched system resources also occurs when a mobile device moves from the coverage area of a first network domain into second network domain that does not provide the same features as the first. FIG. 2 is a simplified block diagram illustrating a handover operation between first and second network domains 210, 220 utilizing different operating schemes.

The first network domain 210 includes a PS domain 211 and a CS domain 213. Similarly, the second network domain 220 includes a PS domain 221 and a CS domain 223. As per this example, the first network domain 210 supports CS fallback and the second network domain 220 does not support CS fallback. In other words, the second network domain 220 will not allow a UE 201 to access the system resources of the CS domain 223. In such a situation, in a conventional system, the UE 201 will be forced to use only the system resources of the PS domain 221 for voice service even though a user may prefer to use the system resources of the CS domain 223 for voice service. A conventionally configured UE cannot override the control of the network with respect to which radio access technology the UE must use to establish a communication link with the second network 220.

Enabling the selection a radio access technology associated with a preferred service by a UE is desirable. Accordingly, in some embodiments, a UE (access terminal or similar) is configured to select a first set of system resources, and communicate a registration message to acquire access to the first set of system resources, wherein the registration message conceals that an access terminal is capable of communication with a second set of system resources. In one embodiment, the first set of system resources includes circuit-switched system resources, the second set of system resources includes packet-switched system resources, and a UE conceals from the network that it is operable using the packet-switched system resources in order to acquire and/or maintain connected mode access to the circuit-switched system resources. Such embodiments allow a UE to use circuit-switched system resources even if the network does not support CS fallback or has refused a CS fallback request. In one embodiment, the first set of system resources includes packet-switched system resources, the second set of system resources includes circuit-switched system resources, and a UE conceals from the network that it is operable using the circuit-switched system resources in order to acquire and/or maintain access to the packet-switched system resources.

Figure 3:
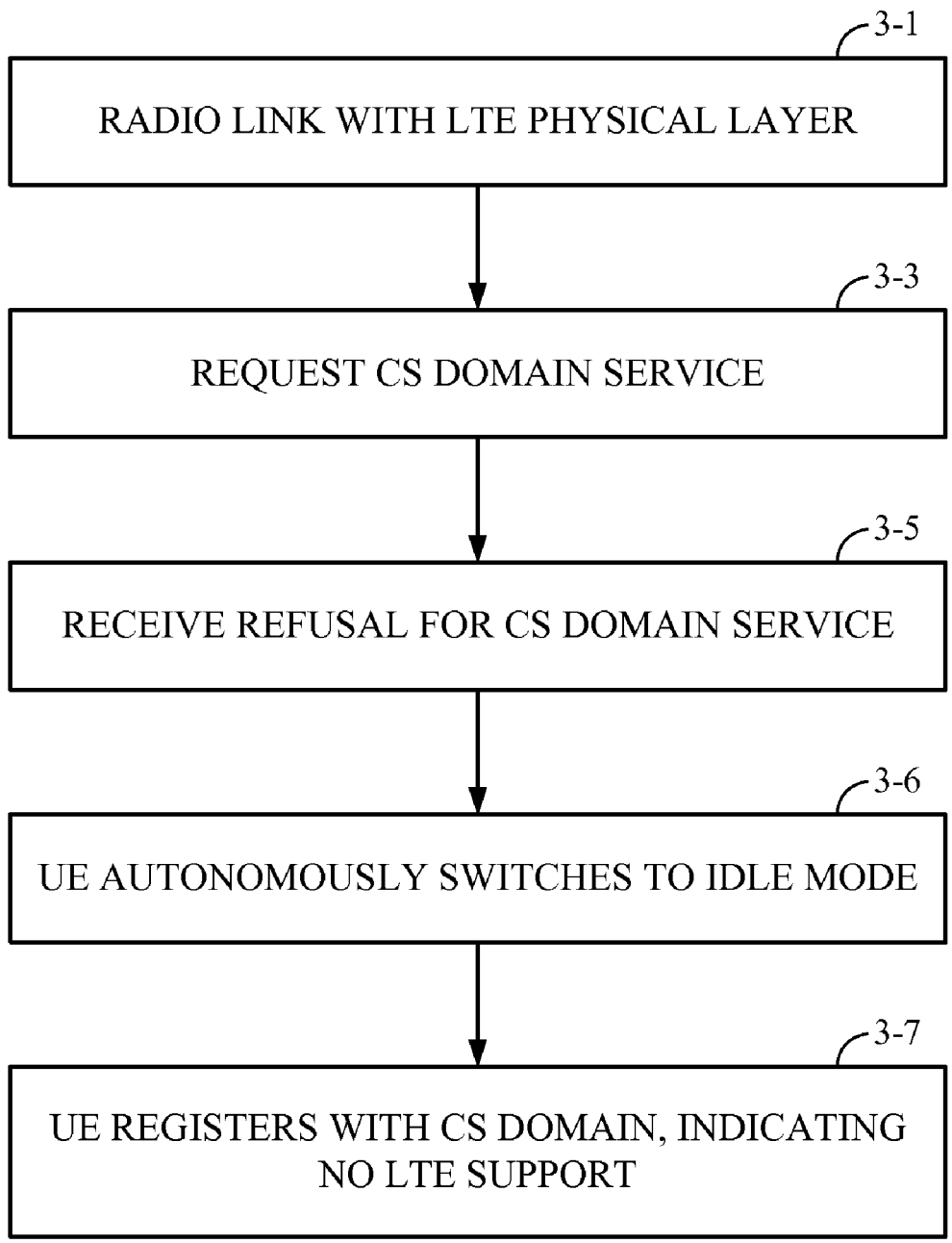
FIG. 3 is a flowchart illustrating a first method to enable selection of a radio access technology associated with a preferred service by user equipment.

FIG. 3 is a flowchart illustrating a first method to enable selection of a radio access technology associated with a preferred service by user equipment. As represented by block 3-1, the method includes a UE accepting a radio link to the physical layer of a network utilizing LTE or similar technology. That is, the UE has a communication link with the system resources in the PS domain of a wireless network. As represented by block 3-3, the method includes the UE requesting CS domain service (e.g. CS fallback for voice service). As represented by block 3-5, the method includes the UE receiving a refusal for access to CS domain service. As represented by block 3-7, the method includes the UE autonomously switching to an idle mode, thereby disconnecting from the system resources of the PS domain without permission from the network. As represented by block 3-9, the method includes the UE registering with the CS domain and indicating within a registration message that the UE does not support LTE. In other words, the UE conceals its ability to operate using the system resources of the PS domain so as to prevent the network from forcing the UE to use the system resources of the PS domain.

Figure 4:
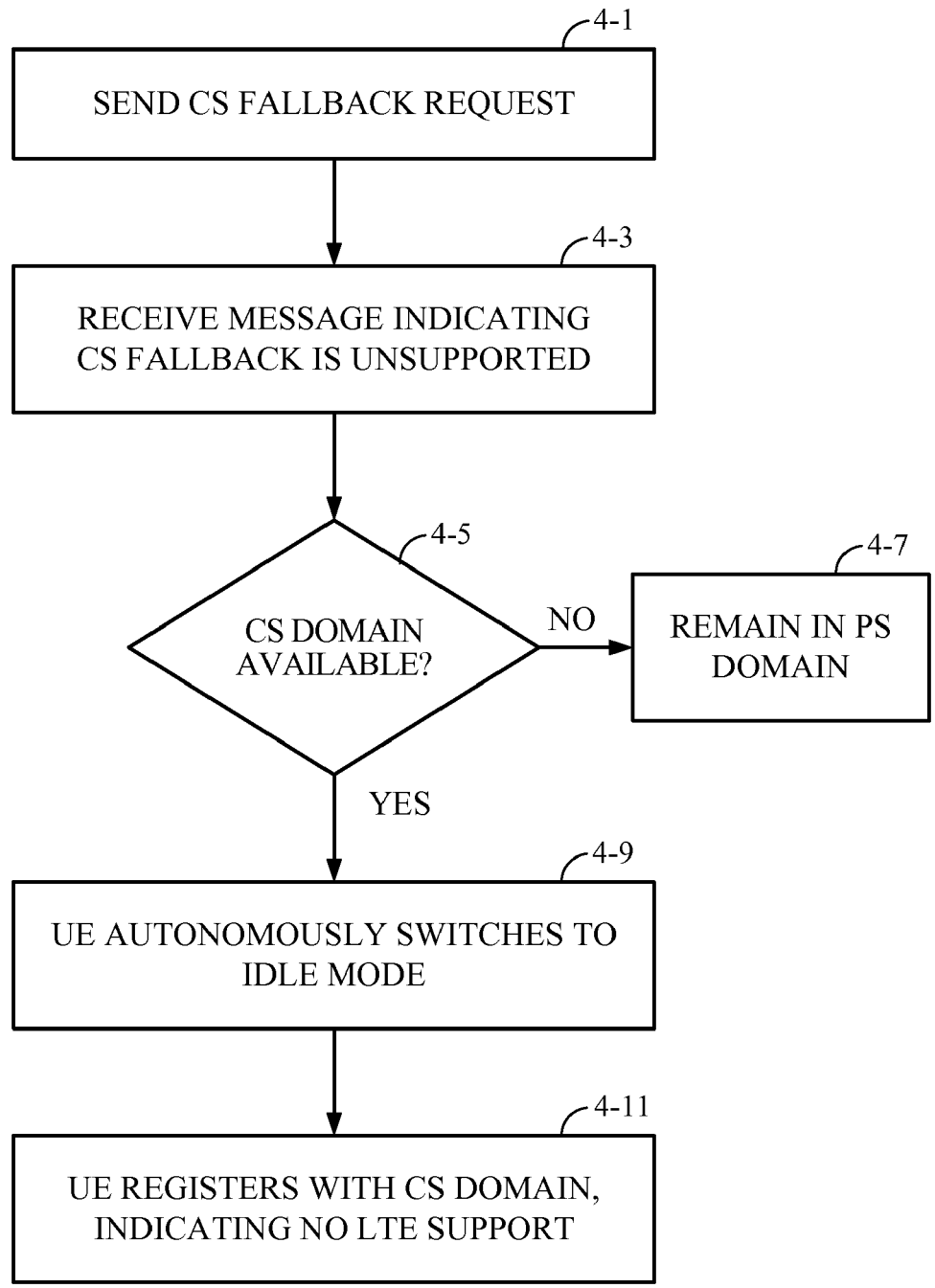
FIG. 4 is a flowchart illustrating a second method to enable selection of a radio access technology associated with a preferred service by user equipment.

FIG. 4 is a flowchart illustrating a second method to enable selection of a radio access technology associated with a preferred service by user equipment. As represented by block 4-1, the method includes a UE sending a CS fallback request to the network in order to access system resources of the CS domain for voice service. As represented by block 4-3, the method includes the UE receiving a message that CS fallback is unsupported by the network. As represented by block 4-5, the method includes the UE determining whether or not CS domain equipment is available for use. In other words, the UE attempts to identify system resources belonging to a CS domain within the same network the UE is connected to. If CS domain equipment is not available (no path from 4-5), as represented by block 407, the method includes the UE remaining connected to the PS domain of the network. On the other hand, if CS domain equipment is available (yes path from 4-5), as represented by block 4-9, the method includes the UE autonomously switching to idle mode, thereby disconnecting from the system resources of the PS domain without permission from the network. As represented by block 4-11, the method includes the UE registering with the CS domain and indicating within a registration message that the UE does not support LTE (i.e. no support for PS domain operation). In other words, the UE conceals its ability to operate using the system resources of the PS domain so as to prevent the network from forcing the UE to use the system resources of the PS domain.

Figure 5:
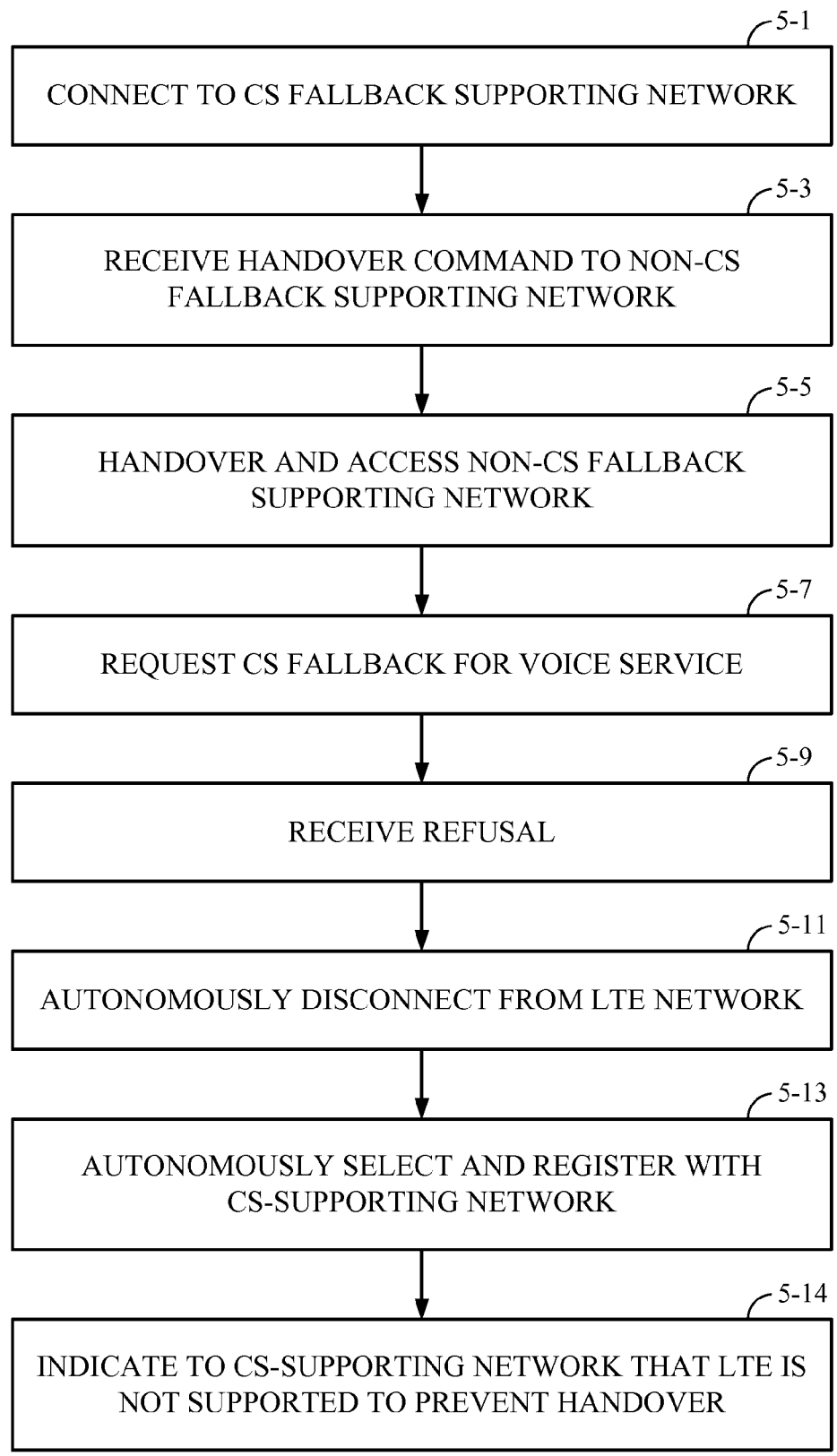
FIG. 5 is a flowchart illustrating a third method to enable selection of a radio access technology associated with a preferred service by user equipment.

FIG. 5 is a flowchart illustrating a third method to enable selection of a radio access technology associated with a preferred service by user equipment that roams from a first network to a second network. As represented by block 5-1, the method includes a UE connecting to a first network supporting CS fallback. As represented by block 5-3, the method includes the UE receiving a handover command directing the UE to establish a communication link to a second network that does not support CS fallback. For example, the handover command may be received in response to the UE moving out of the coverage area of the first network into the coverage area of the second network. As represented by block 5-5, the method includes the UE accepting the handover and accessing the second network.

However, the UE may be unaware that the second network does not support CS fallback and/or the UE may not be configured to choose as to whether to accept or deny the handover command at this point. As represented by block 5-7, the method includes the UE sending a CS fallback request to the network in order to access system resources of the CS domain for voice service. As represented by block 5-9, the method includes the UE receiving a refusal message. As represented by block 5-11, the method includes the UE autonomously switching to idle mode, thereby disconnecting from the system resources of the PS domain without permission from the network. As represented by block 5-13, the method includes the UE autonomously selecting and registering with the CS domain. As indicated by 5-14, the method includes the UE indicating within a registration message that the UE does not support LTE. In other words, the UE conceals its ability to operate using the system resources of the PS domain so as to prevent the network from forcing the UE to use the system resources of the PS domain.

Figure 6:
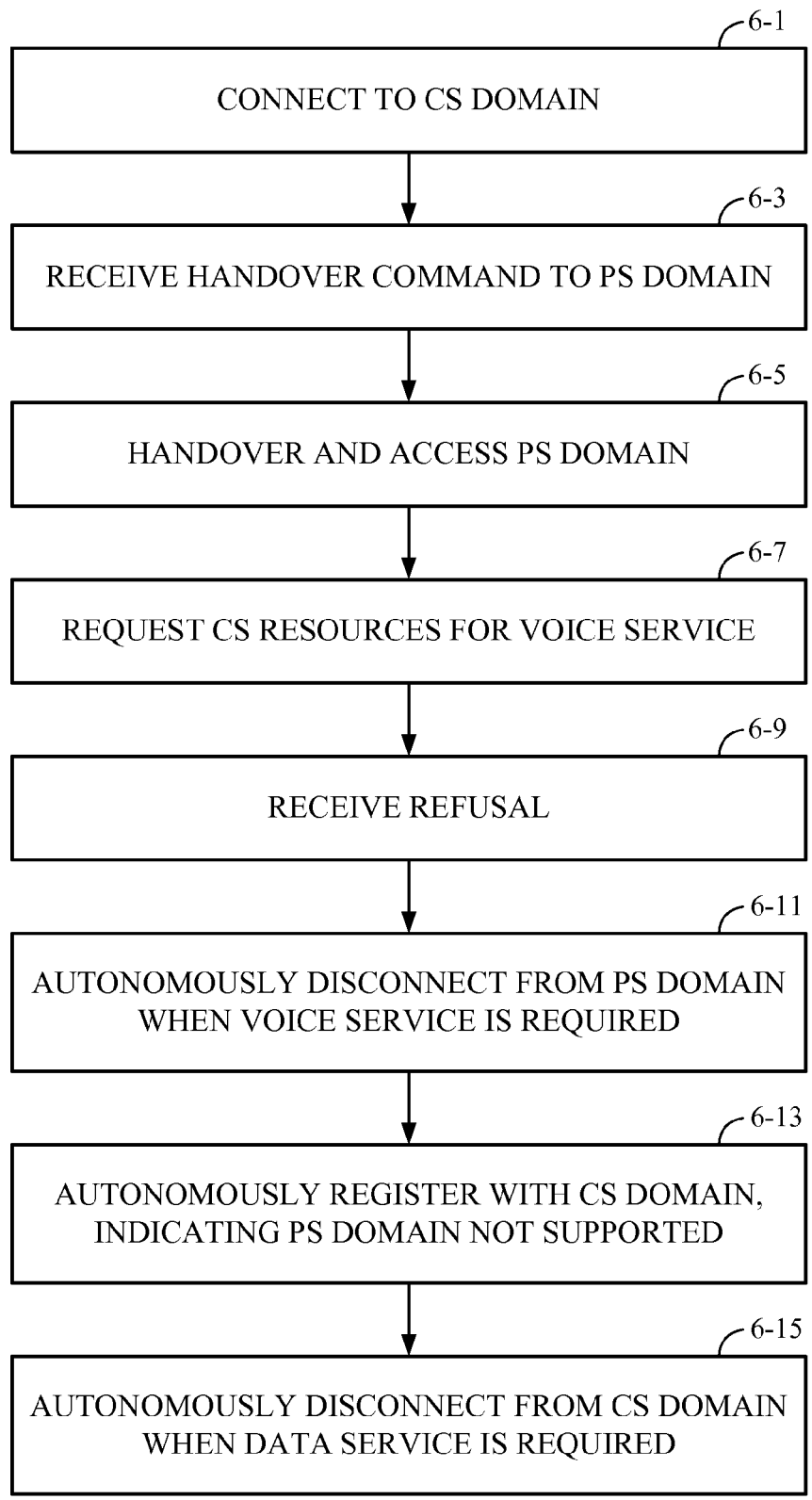
FIG. 6 is a flowchart illustrating a fourth method to enable selection of a radio access technology associated with a preferred service by user equipment.

FIG. 6 is a flowchart illustrating a fourth method to enable selection of a radio access technology associated with a preferred service by user equipment. As represented by block 6-1, the method includes a UE initially connecting to a CS domain within a wireless network. As represented by block 6-3, the method includes the UE receiving a handover command directing the UE to establish a communication link with the PS domain of the wireless network. As represented by block 6-5, the method includes the UE accepting the handover and accessing the PS domain. As represented by block 6-7, the method includes the UE sending a CS fallback request to the network in order to access system resources of the CS domain for voice service. As represented by block 6-9, the method includes the UE receiving a refusal message. As represented by block 6-11, the method includes the UE autonomously disconnecting from the system resources of the PS domain when voice serviced is required, without permission from the network. As represented by block 6-13, the method includes the UE autonomously selecting and registering with the CS domain, and indicating within a registration message that the UE does not support the PS domain technology. In other words, the UE conceals its ability to operate using the system resources of the PS domain so as to prevent the network from forcing the UE to use the system resources of the PS domain. As indicated by 6-15, the method includes the UE autonomously selecting and registering with the PS domain, when data serviced is required.

Figure 7:
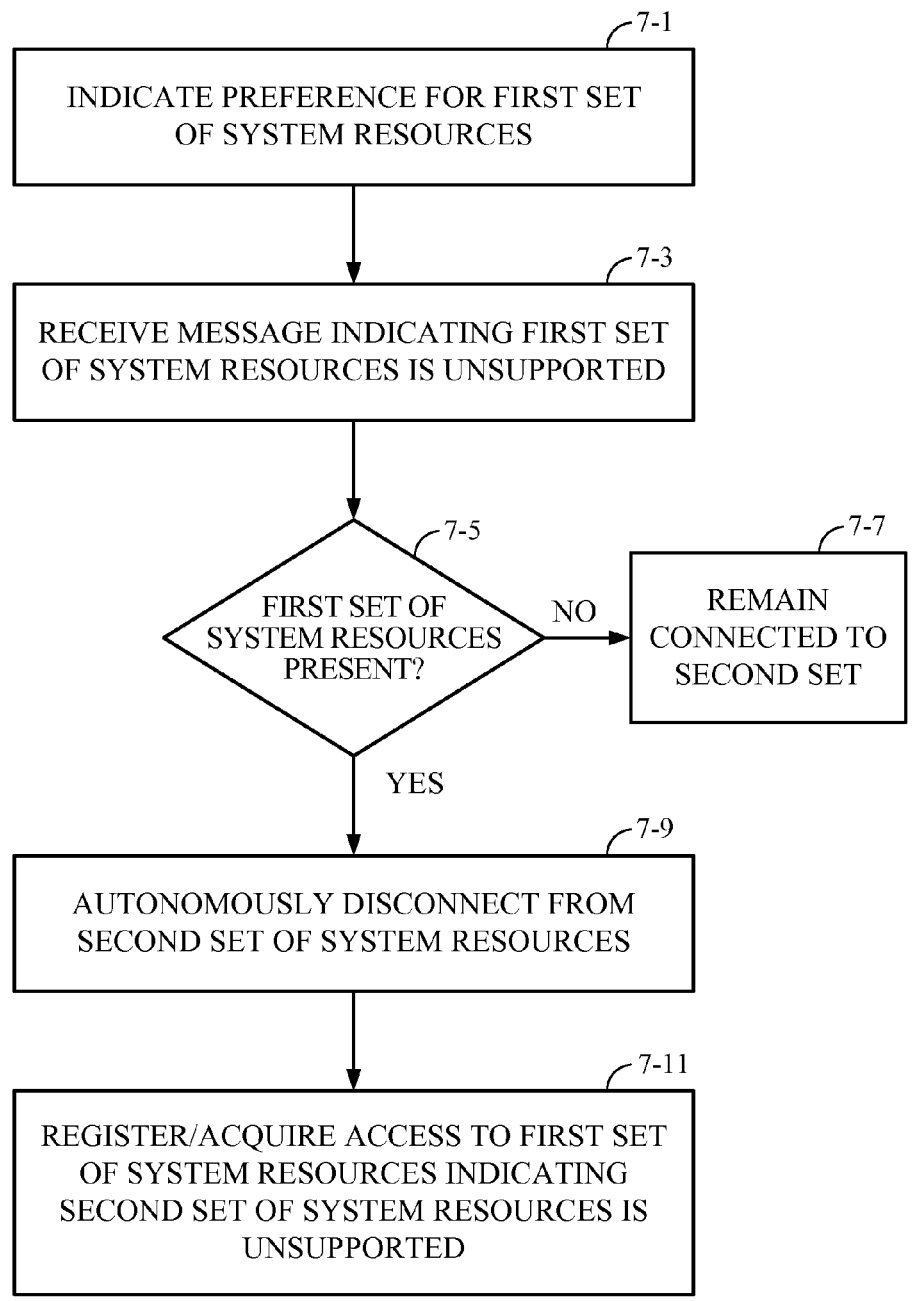
FIG. 7 is a flowchart illustrating a fifth method to enable selection of a radio access technology associated with a preferred service by user equipment.

FIG. 7 is a flowchart illustrating a fifth method to enable selection of a radio access technology by user equipment. As represented by block 7-1, the method includes a UE indicating a preference for a first set of system resources. As represented by block 7-3, the method includes the UE receiving a message that the first set of system resources is unsupported. As represented by block 7-5, the method includes the UE independently determining if the first set of system resources is available for use. If the first set of system resources is not available or not present (no path from 7-5), as represented by block 7-7, the method includes the UE electing to remain connected to a second set of system resources. On the other hand, if the first set of system resources is available (yes path from 7-5), as represented by block 7-9, the method includes the UE autonomously disconnecting from the second set of system resources. As represented by block 7-11, the method includes the UE registering for access with the first set of system resources, and indicating within a registration message that the UE does not support operation using the second set of system resources. In other words, the UE conceals its ability to operate using the second set of system resources so as to prevent the network from forcing the UE to use the second set of system resources.

Figure 8:
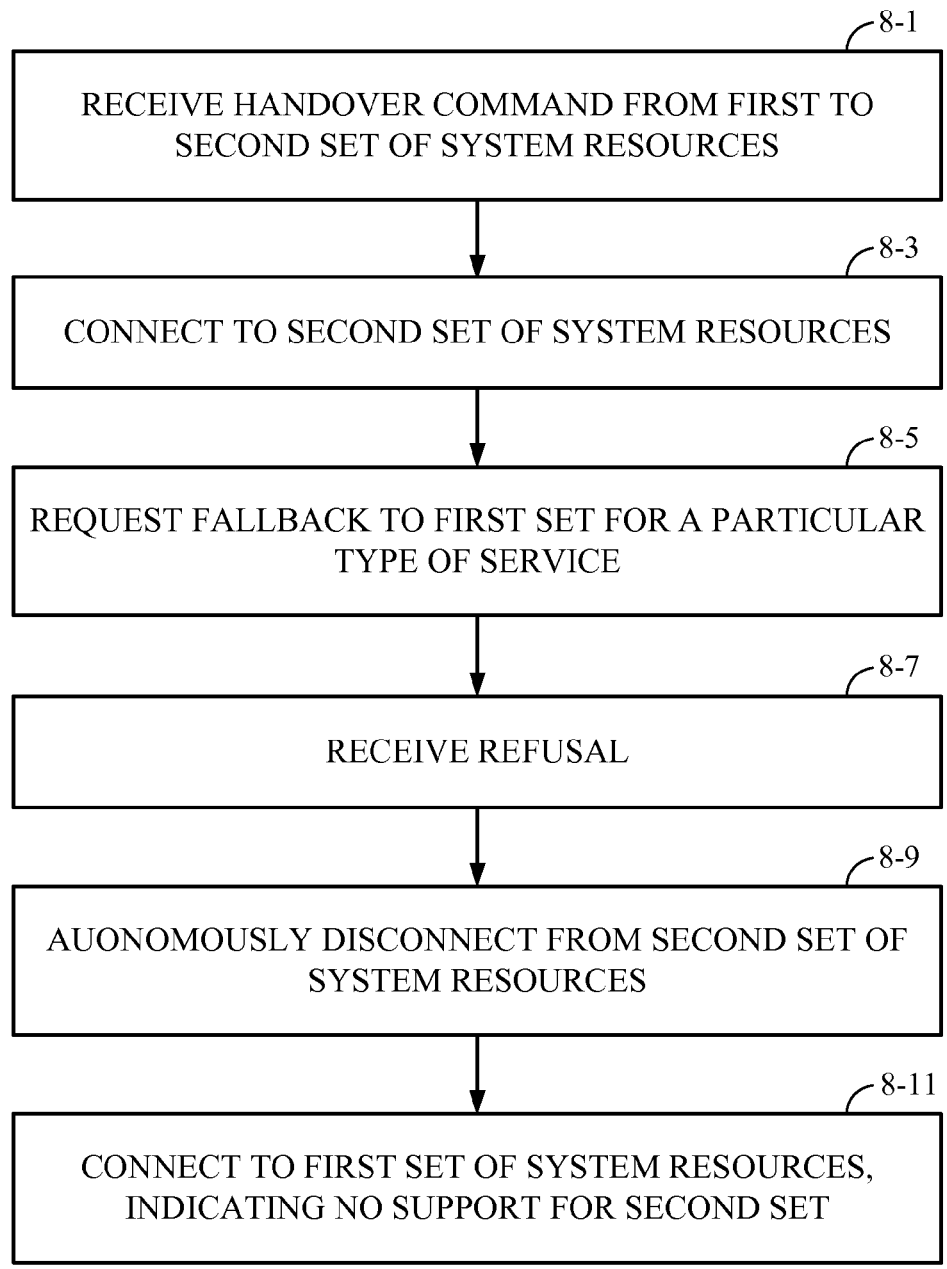
FIG. 8 is a flowchart illustrating a sixth method to enable selection of a radio access technology associated with a preferred service by user equipment.

FIG. 8 is a flowchart illustrating a sixth method to enable selection of a radio access technology associated with a preferred service by user equipment. As represented by block 8-1, the method includes a UE receiving a handover command directing the UE to switch from a first set of system resources to a second set of system resources. As represented by block 8-3, the method includes the UE accepting the handover and accessing the second set of system resources. As represented by block 8-5, the method includes the UE sending a fallback request to the network in order to access the first set of system resources for a particular service. As represented by block 8-7, the method includes the UE receiving a refusal message. As represented by block 8-9, the method includes the UE autonomously disconnecting from the second set of system resources, without permission from the network. As represented by block 8-11, the method includes the UE autonomously selecting and registering with the first set of system resources, and indicating within a registration message that the UE does not support operation using the second set of system resources. In other words, the UE conceals its ability to operate using the second set of system resources so as to prevent the network from forcing the UE to use the second set of system resources.

Figure 9:
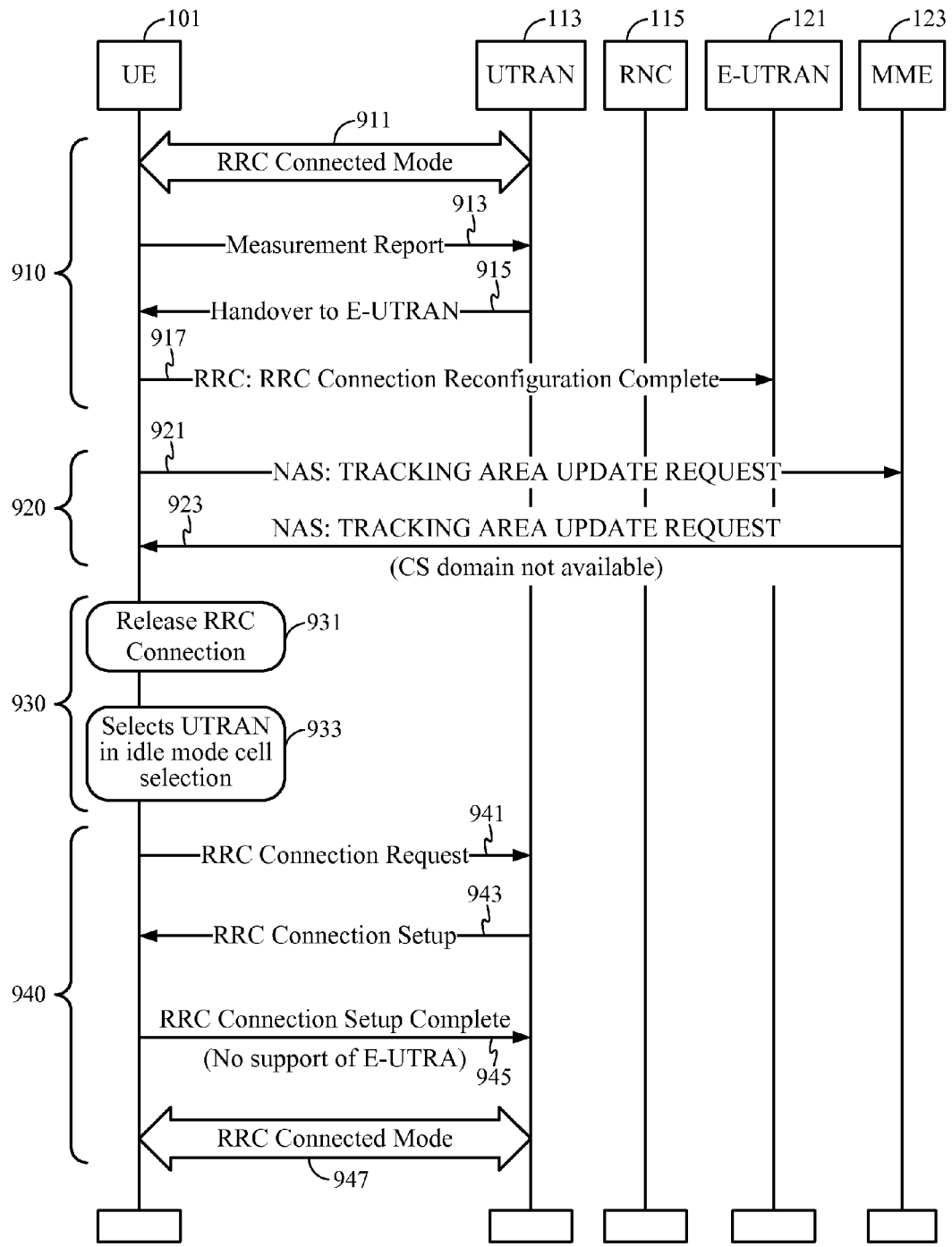
FIG. 9 is a simplified signaling diagram between components of the system illustrated in FIG. 1 illustrating a method enabling selection of a radio access technology associated with a preferred service by user equipment.

FIG. 9 is a simplified signaling diagram between components of the system 100 illustrated in FIG. 1 illustrating a method enabling selection of a radio access technology associated with a preferred service by user equipment. Signals resulting in a handover of the UE 101 from the CS domain 110 to the PS domain 120 are generally indicated by 910. As indicated by signal 911, the UE 101 is in connected mode with the UTRAN node 113 of the CS domain 110. As indicated by signal 913, the UE 101 reports to the UTRAN 113 that the UE 101 can operate on the PS domain 120. As indicated by signal 915, the UTRAN node 113, on behalf of the system 100, sends a handover command to the UE 101. The handover command directs the UE 101 to switch to the PS domain 120 and access the system 100 through the E-UTRAN node 121. As indicated by signal 917, the UE reports that the handover has been accepted and is complete.

Signals resulting in a CS fallback request refusal by the network are generally indicated by 920. As indicated by signal 921, the UE 101 requests CS fallback service using a NAS (non-access stratum) tracking area update request. As indicated by signal 923, the MME 123, through the E-UTRAN node 121, refuses the CS fallback request made by the UE 101.

As generally indicated by 930, the UE 101 autonomously disconnects from the PS domain 120 and connects to the CS domain. To that end, as indicated by block 931, the UE 101 releases the connection with the PS domain 120, without signaling the E-UTRAN node 121. As described above, the UE 101 releases the connection by autonomously entering an idle mode. Subsequently, as indicated by block 933, the UE 101 selects the UTRAN node 113.

Signals resulting in a reestablishment of the connection between the UE 101 and the UTRAN node 113 of the CS domain 110 are generally indicated by signal 940. To that end, as indicated by signal 941, the UE 101 sends a connection request to the UTRAN node 113. As indicated by signal 943, the UTRAN node 113 responds to the UE 101 by returning a connection setup message and query. Conventionally, the UE 101 would respond by indicating that the UE 101 can support packet-switched communication. However, the UE 101 now has knowledge that that the system 100 will transfer the UE 101 to the PS domain 120 if the system 100 knows that the UE 101 can support packet-switched communication. In order to avoid being switched to the PS domain 120, as indicated by signal 945, the UE 101 in accordance with some embodiments, conceals that the UE 101 can operate within the PS domain 120. In turn, the UTRAN node 113 will not start the process of handing-over the UE 101 to the E-UTRAN node 121 as described above with reference to the signals generally indicated by 910. Thus, as indicated by signal 947, the UE 101 is able to operate in connected mode with the UTRAN node 113 within the CS domain 110.

Figure 10:
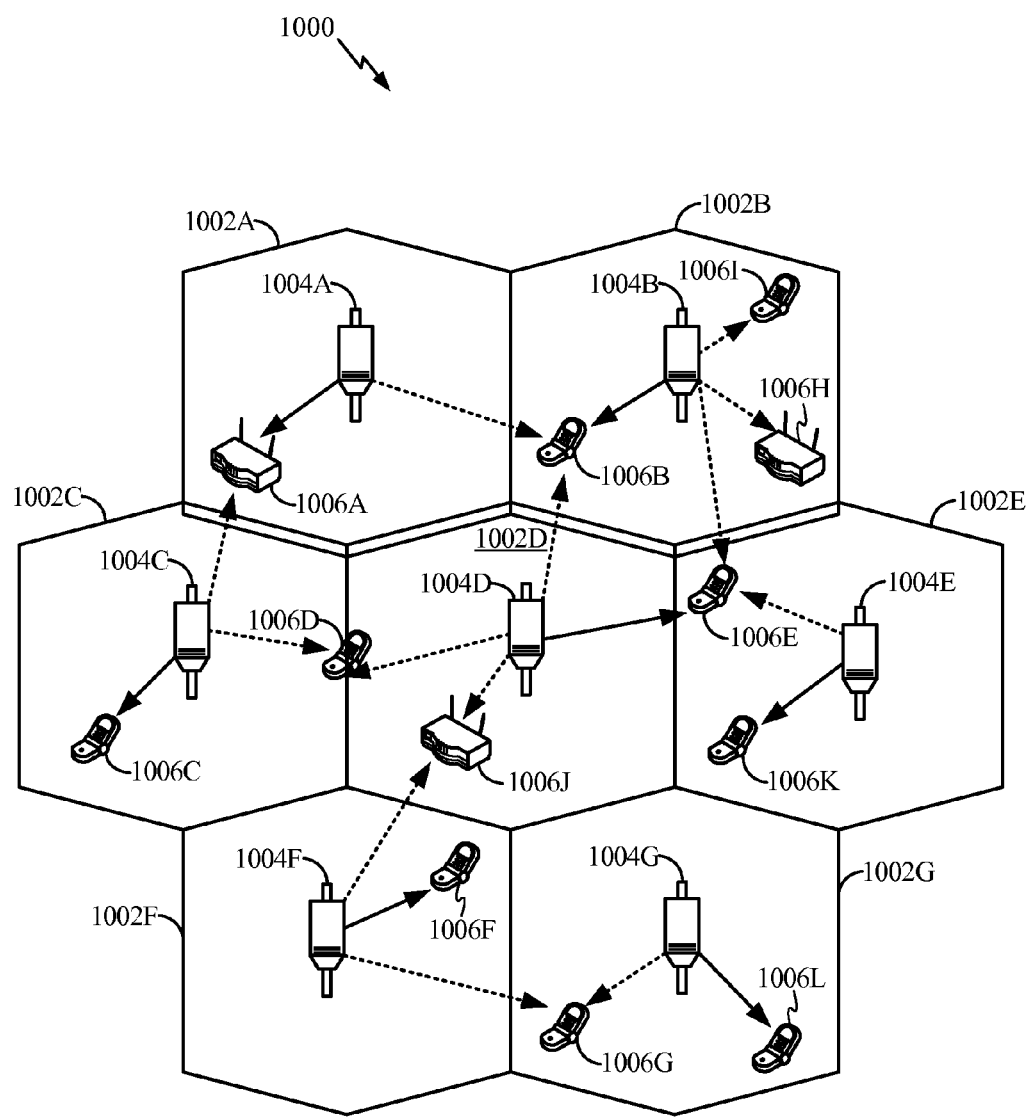
FIG. 10 is a simplified diagram of a wireless communication system.

FIG. 10 is a simplified diagram of a wireless communication system 1000, configured to support a number of users, in which the teachings herein may be implemented. The system 1000 provides communication for multiple cells 1002, such as, for example, macro cells 1002A-1002G, with each cell being serviced by a corresponding access point 1004 (e.g., access points 1004A-1004G). Access terminals 1006 (e.g., access terminals 1006A-1006L) may be dispersed at various locations throughout the system over time. Each access terminal 1006 may communicate with one or more access points 1004 on a forward link (FL) and/or a reverse link (RL) at a given moment, depending upon whether the access terminal 1006 is active and whether it is in soft handoff, for example. The wireless communication system 1000 may provide service over a large geographic region. For example, macro cells 1002A-1002G may cover a few blocks in a densely populated urban neighborhood or several miles in rural environment.

Figure 11:
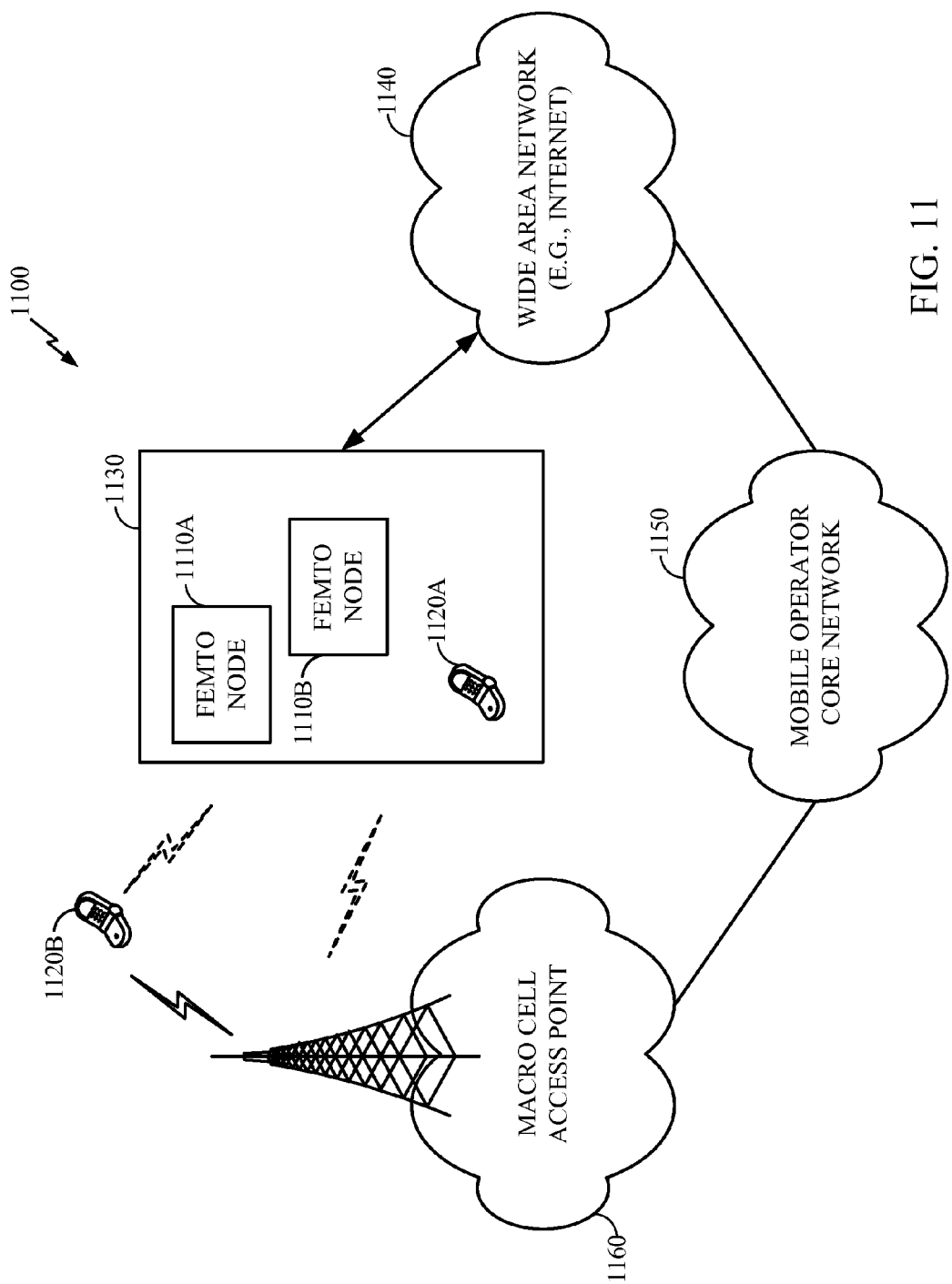
FIG. 11 is a simplified diagram of a wireless communication system including femto nodes.

FIG. 11 is a simplified diagram of an exemplary communication system 1100 where one or more femto nodes are deployed within a network environment. Specifically, the system 1100 includes multiple femto nodes 1110 (e.g., femto nodes 1110A and 1110B) installed in a relatively small scale network environment (e.g., in one or more user residences 1130). Each femto node 1110 may be coupled to a wide area network 1140 (e.g., the Internet) and a mobile operator core network 1150 via a DSL router, a cable modem, a wireless link, or other connectivity means (not shown). As will be discussed below, each femto node 1110 may be configured to serve associated access terminals 1120 (e.g., access terminal 1120A) and, optionally, alien access terminals 1120 (e.g., access terminal 1120B). In other words, access to femto nodes 1110 may be restricted whereby a given access terminal 1120 may be served by a set of designated (e.g., home) femto node(s) 1110 but may not be served by any non-designated femto nodes 1110 (e.g., a neighbor's femto node 1110).

Figure 12:
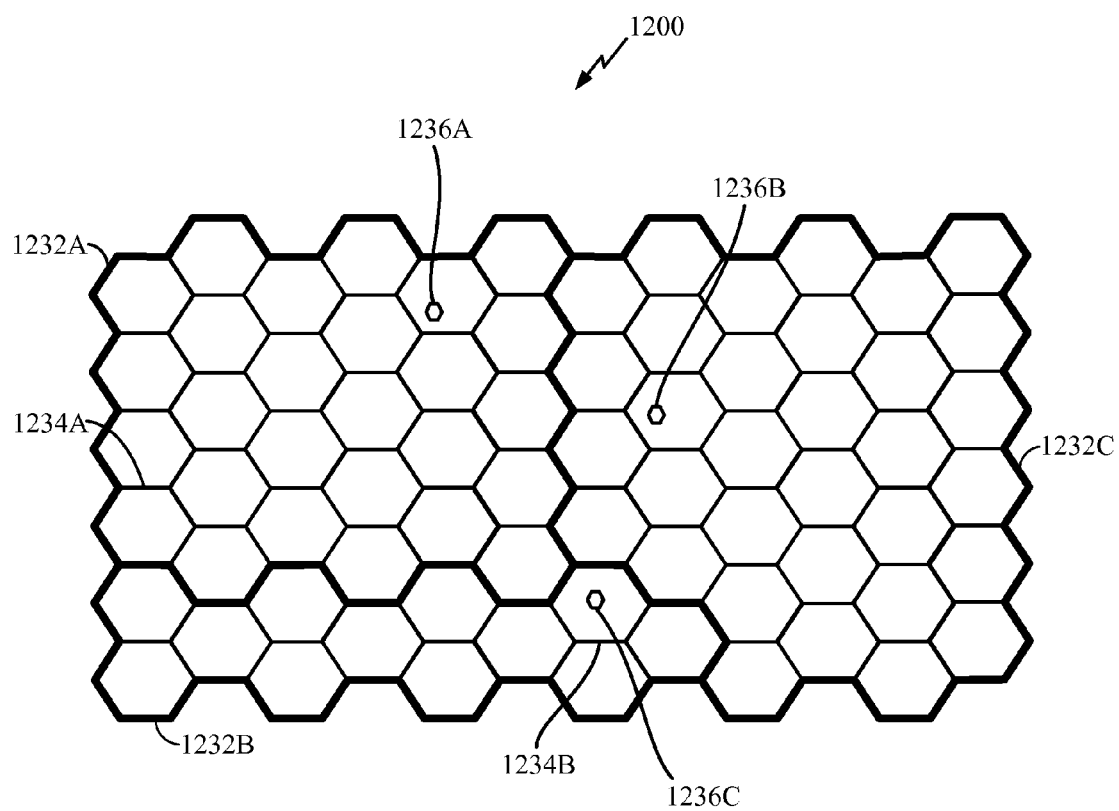
FIG. 12 is a simplified diagram illustrating coverage areas for wireless communication.

FIG. 12 is a simplified diagram illustrating an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the hexagons. The tracking areas 1202 also include femto coverage areas 1206. In this example, each of the femto coverage areas 1206 (e.g., femto coverage area 1206C) is depicted within a macro coverage area 1204 (e.g., macro coverage area 1204B). It should be appreciated, however, that a femto coverage area 1206 may not lie entirely within a macro coverage area 1204. In practice, a large number of femto coverage areas 1206 may be defined with a given tracking area 1202 or macro coverage area 1204. Also, one or more pico coverage areas (not shown) may be defined within a given tracking area 1202 or macro coverage area 1204.

Referring again to FIG. 11, the owner of a femto node 1110 may subscribe to mobile service, such as, for example, 3 G mobile service, offered through the mobile operator core network 1150. In addition, an access terminal 1120 may be capable of operating both in macro environments and in smaller scale (e.g., residential) network environments. In other words, depending on the current location of the access terminal 1120, the access terminal 1120 may be served by a macro cell access point 1160 associated with the mobile operator core network 1150 or by any one of a set of femto nodes 1110 (e.g., the femto nodes 1110A and 1110B that reside within a corresponding user residence 1130). For example, when a subscriber is outside his home, he is served by a standard macro access point (e.g., access point 1160) and when the subscriber is at home, he is served by a femto node (e.g., node 1110A). Here, it should be appreciated that a femto node 1110 may be backward compatible with existing access terminals 1120.

A femto node 1110 may be deployed on a single frequency or, in the alternative, on multiple frequencies. Depending on the particular configuration, the single frequency or one or more of the multiple frequencies may overlap with one or more frequencies used by a macro access point (e.g., access point 1160).

In some aspects, an access terminal 1120 may be configured to connect to a preferred femto node (e.g., the home femto node of the access terminal 1120) whenever such connectivity is possible. For example, whenever the access terminal 1120 is within the user's residence 1130, it may be desired that the access terminal 1120 communicate only with the home femto node 1110.

In some aspects, if the access terminal 1120 operates within the macro cellular network 1150 but is not residing on its most preferred network (e.g., as defined in a preferred roaming list), the access terminal 1120 may continue to search for the most preferred network (e.g., the preferred femto node 1110) using a Better System Reselection (BSR), which may involve a periodic scanning of available systems to determine whether better systems are currently available, and subsequent efforts to associate with such preferred systems. With the acquisition entry, the access terminal 1120 may limit the search for specific band and channel. For example, the search for the most preferred system may be repeated periodically. Upon discovery of a preferred femto node 1110, the access terminal 1120 selects the femto node 1110 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1110 that reside within the corresponding user residence 1130). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a closed subscriber group (CSG) may be defined as the set of access points (e.g., femto nodes) that share a common access control list of access terminals. A restricted access point may include a CSG that allows multiple access terminals to connect to it. A single access terminal may have the ability connect to multiple restricted access points. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
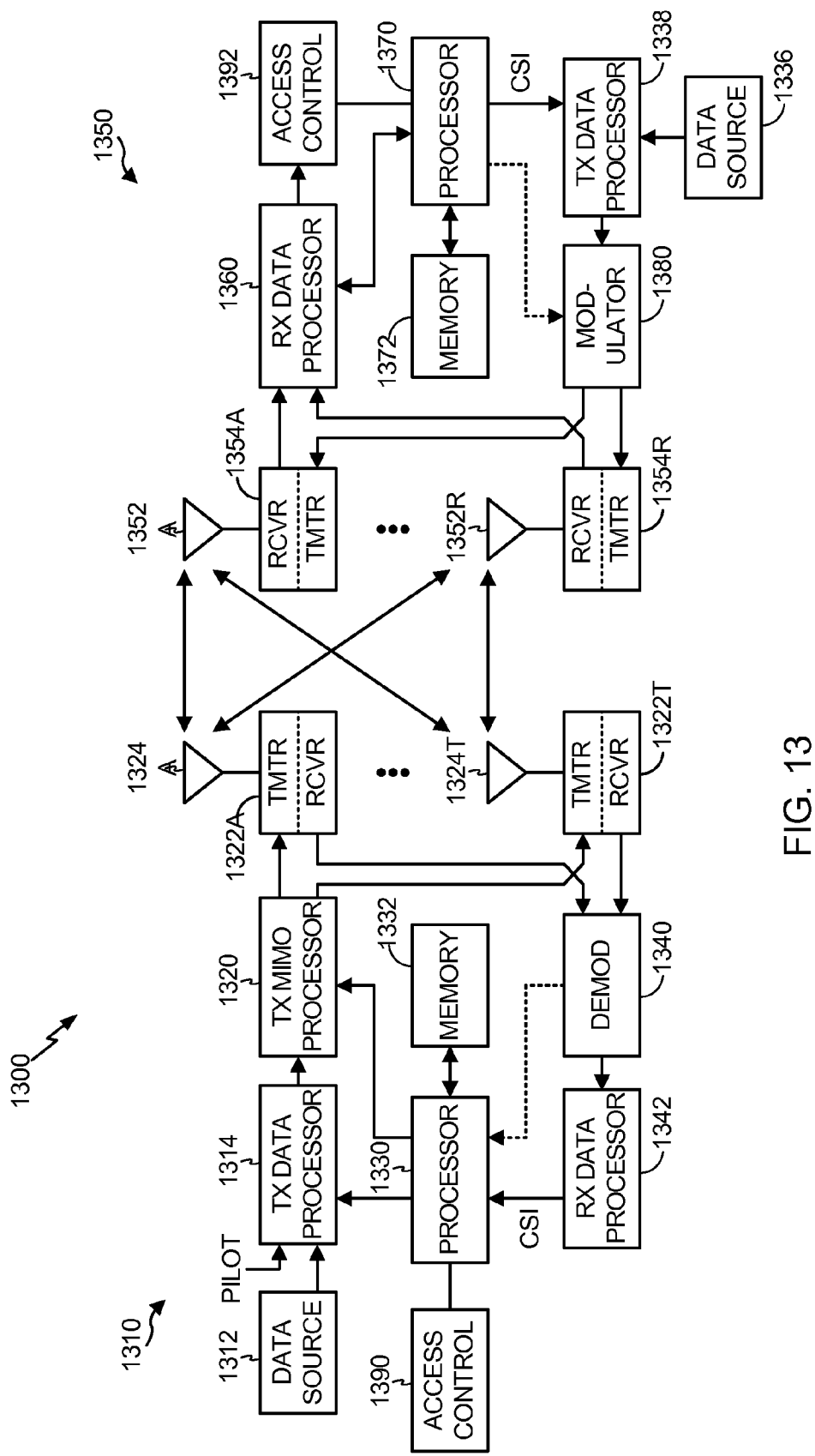
FIG. 13 is a simplified block diagram of several sample aspects of communication components.
Figure 14:
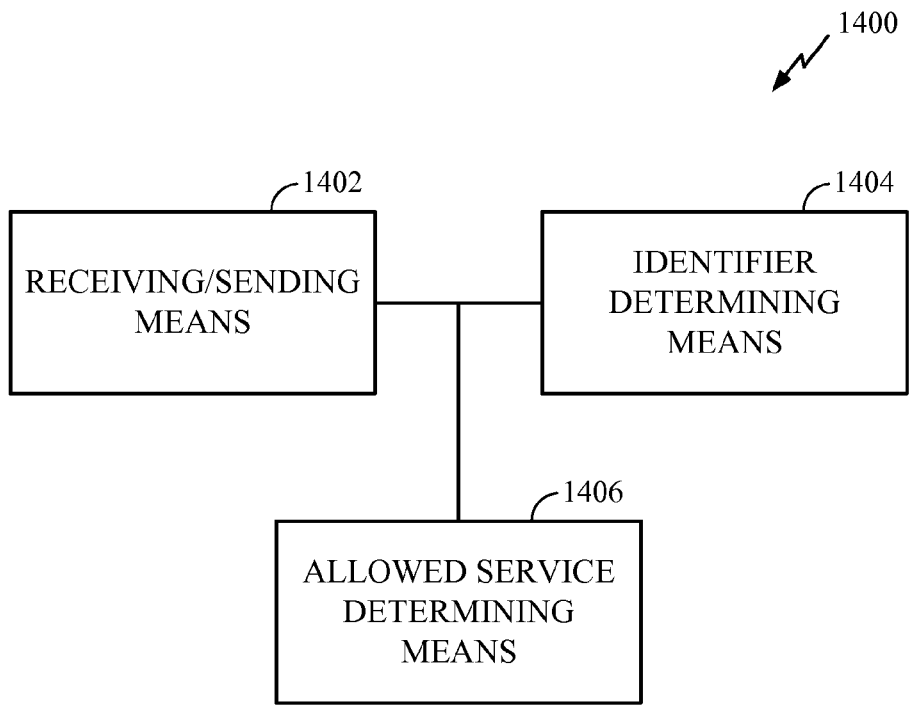
FIGS. 14-24 are simplified block diagrams of several sample aspects of apparatuses configured to provide provisioning and/or access management as taught herein.
Figure 15:
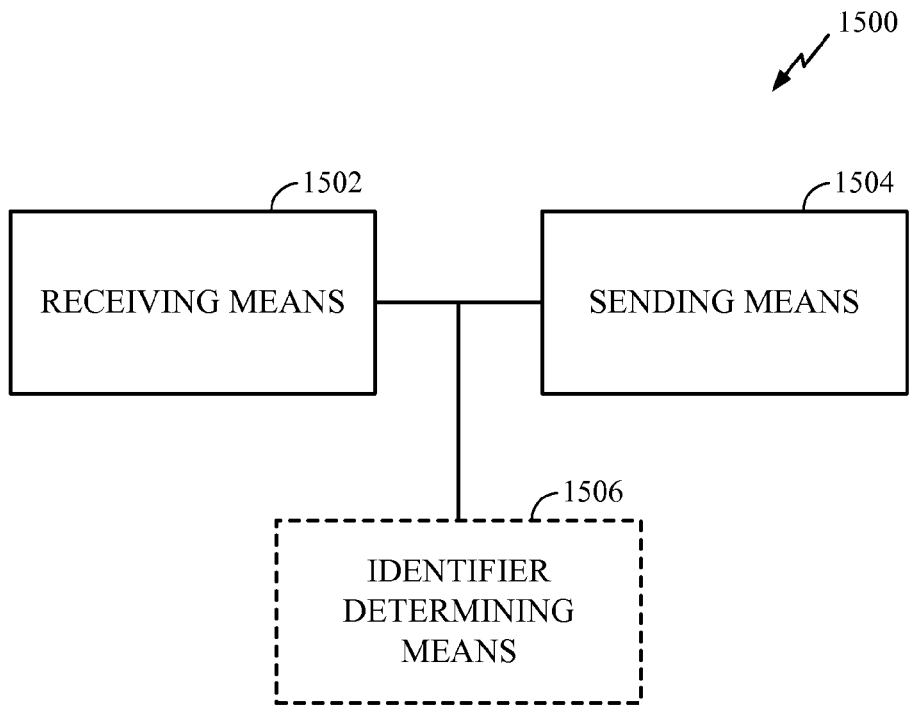
Figure 16:
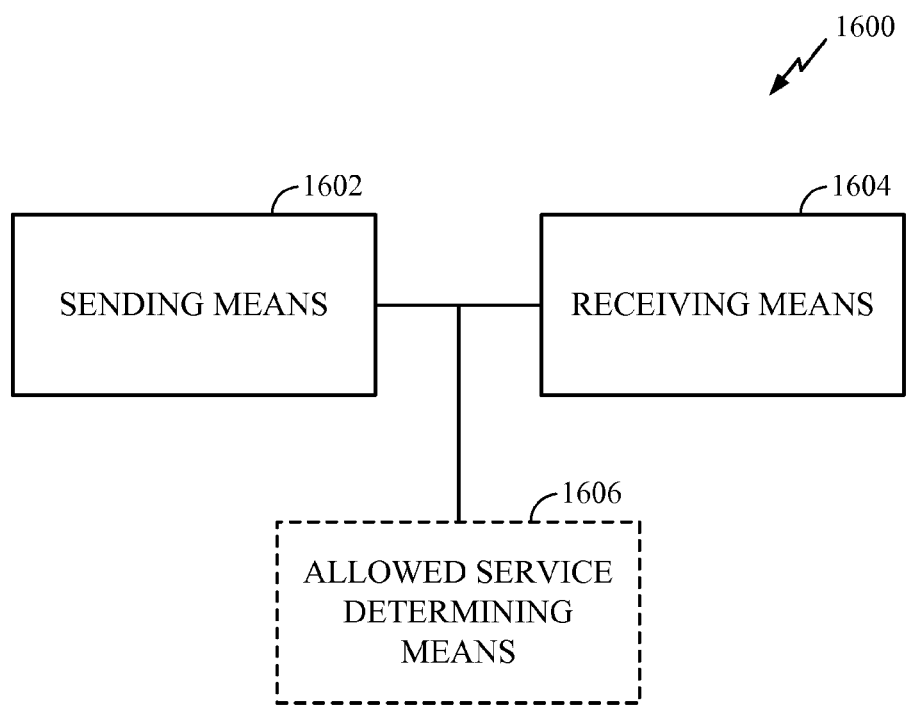
Figure 17:
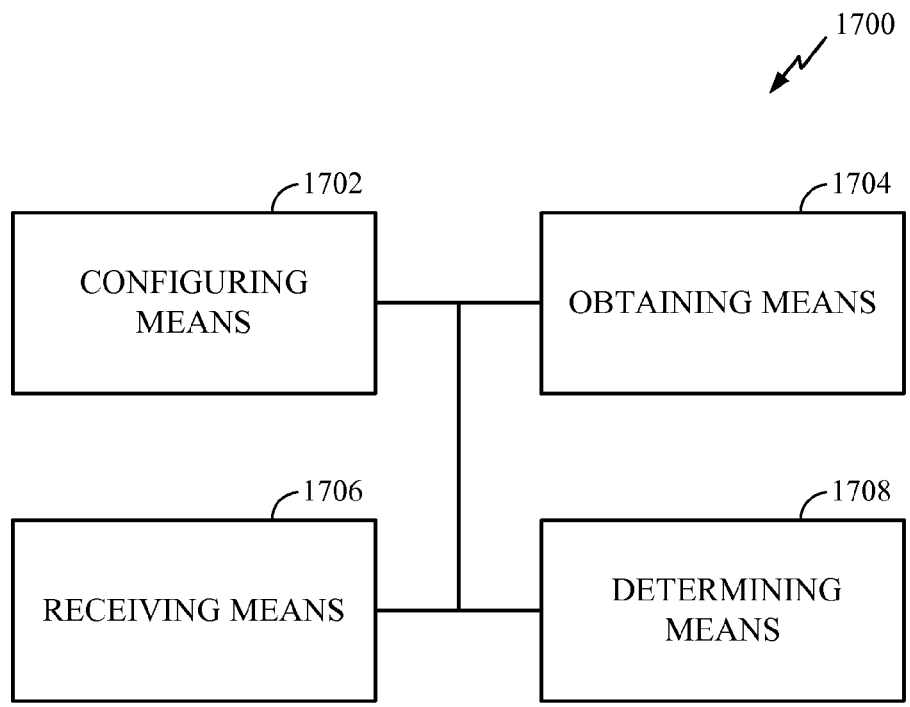
Figure 18:
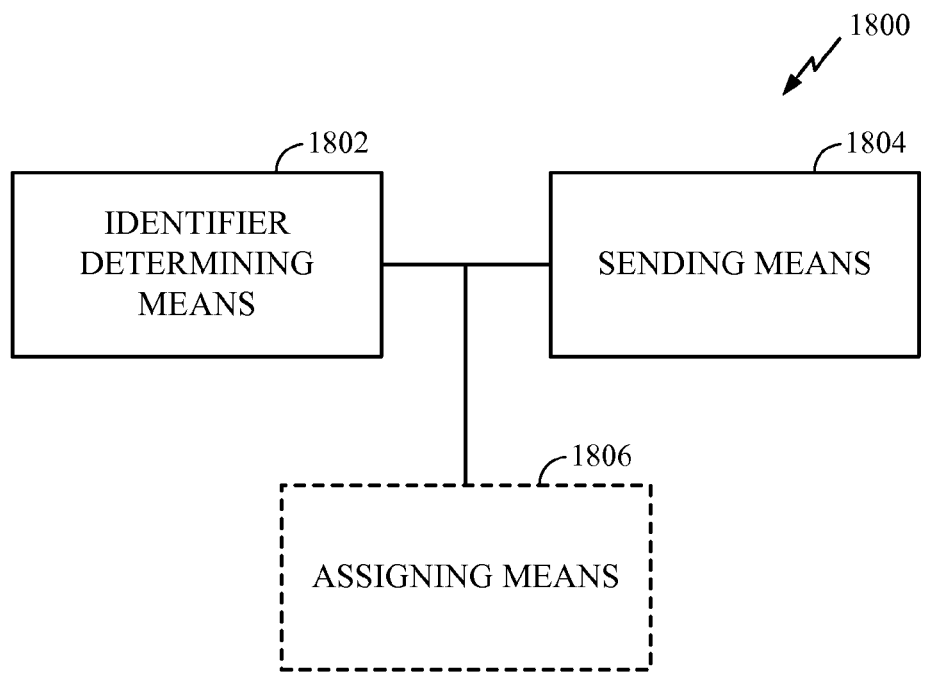
Figure 19:
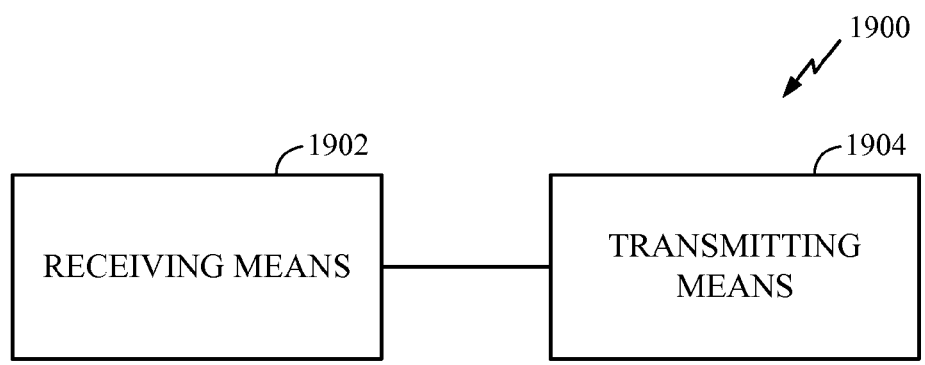
Figure 20:
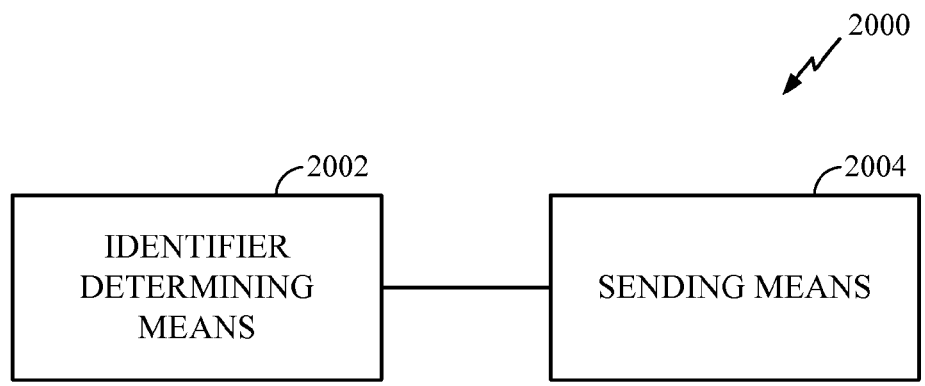
Figure 21:
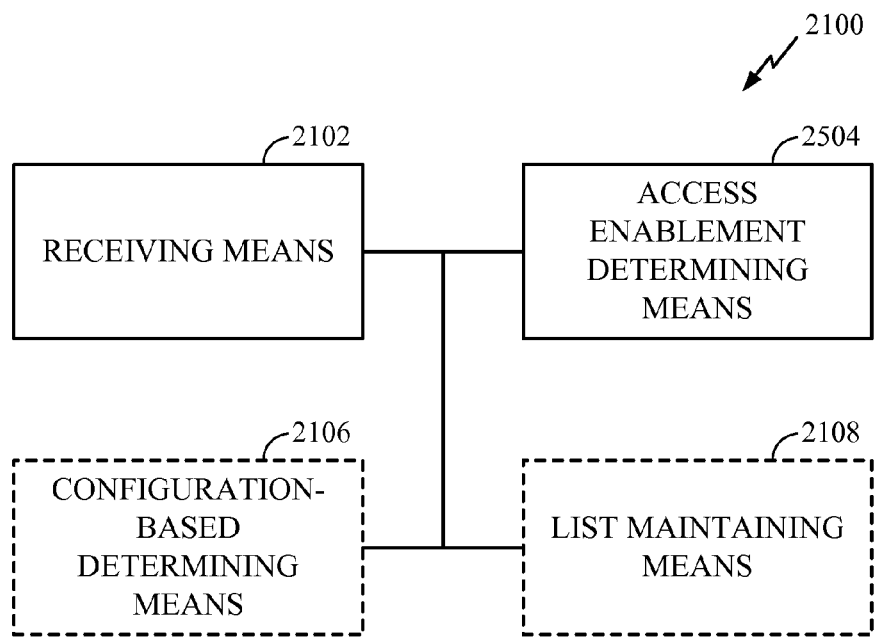
Figure 22:
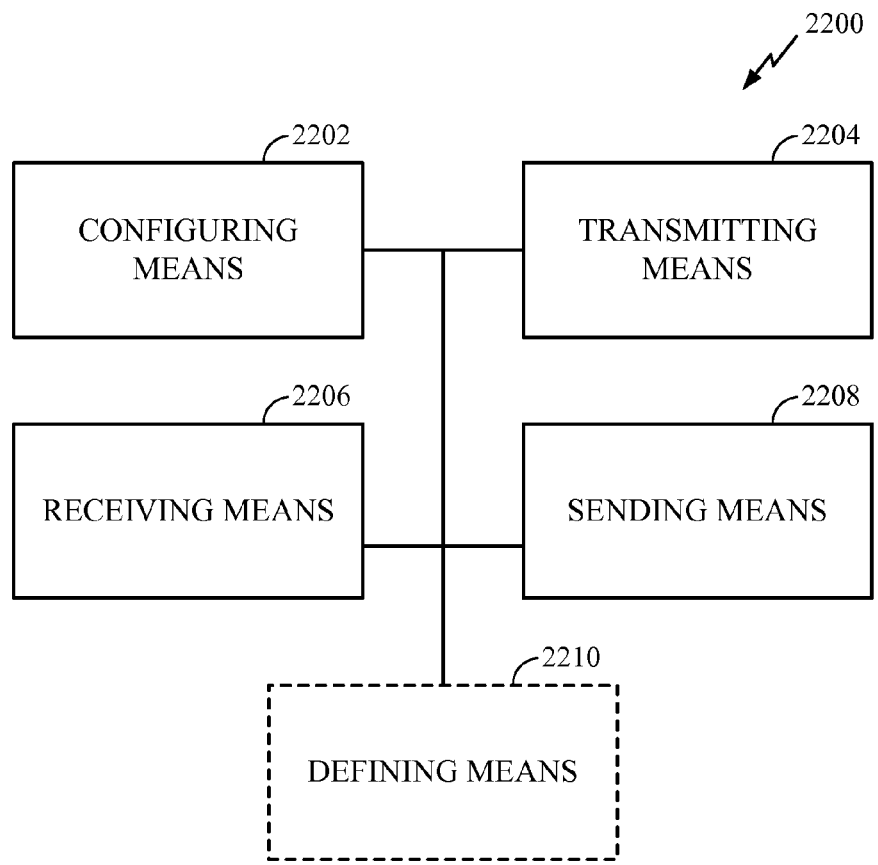
Figure 23:
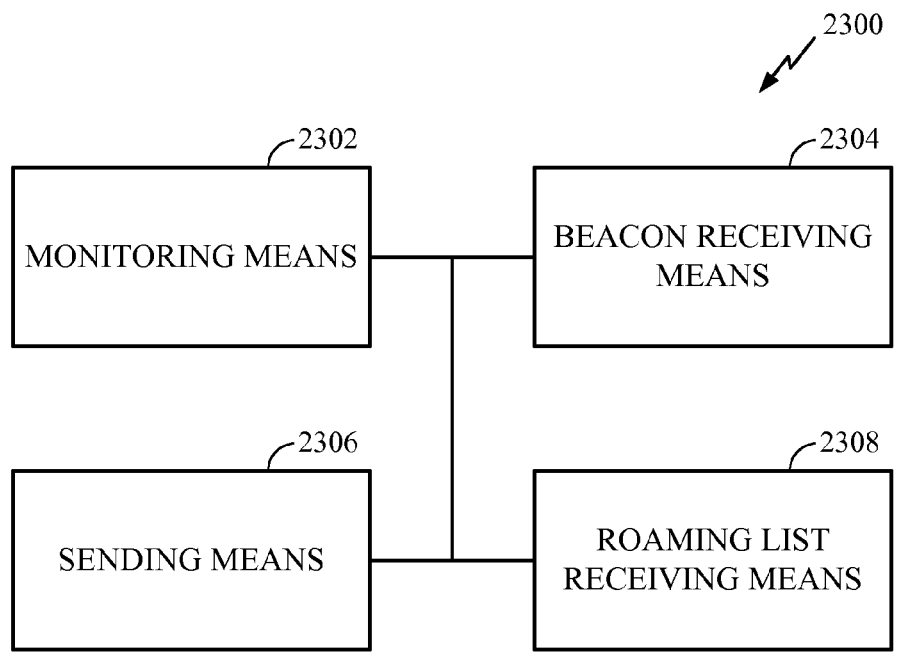
Figure 24:
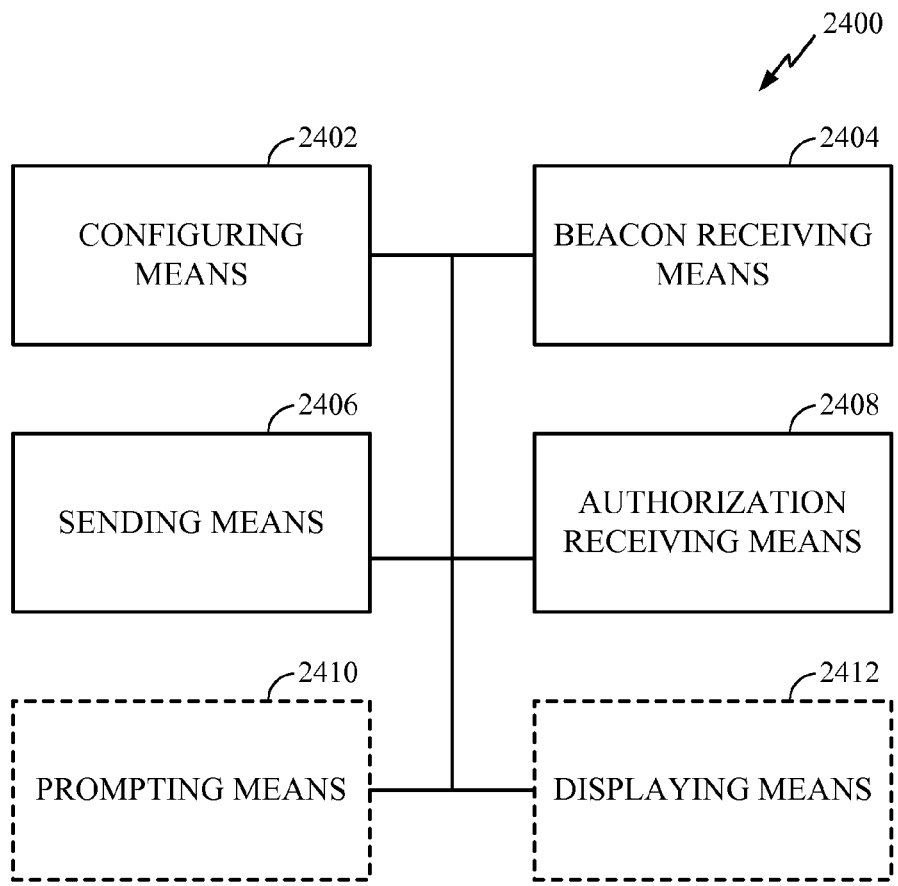

The teachings herein may be incorporated into a node (e.g., a device) employing various components for communicating with at least one other node. FIG. 13 depicts several sample components that may be employed to facilitate communication between nodes. Specifically, FIG. 13 is a simplified block diagram of a first wireless device 1310 (e.g., an access point) and a second wireless device 1350 (e.g., an access terminal) of a MIMO system 1300. At the first device 1310, traffic data for a number of data streams is provided from a data source 1312 to a transmit (TX) data processor 1314.

In some aspects, each data stream is transmitted over a respective transmit antenna. The TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers (XCVR) 1322A through 1322T. In some aspects, the TX MIMO processor 1320 applies beam-forming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the second device 1350, the transmitted modulated signals are received by $N_R$ antennas 1352A through 1352R and the received signal from each antenna 1352 is provided to a respective transceiver (XCVR) 1354A through 1354R. Each transceiver 1354 conditions (e.g., filters, amplifies, and downconverts) a respective received signal, digitizes the conditioned signal to provide samples, and further processes the samples to provide a corresponding "received" symbol stream.

A receive (RX) data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which pre-coding matrix to use (discussed below). The processor 1370 formulates a reverse link message comprising a matrix index portion and a rank value portion. A data memory 1372 may store program code, data, and other information used by the processor 1370 or other components of the second device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the second device 1350 are received by the antennas 1324, conditioned by the transceivers 1322, demodulated by a demodulator (DEMOD) 1340, and processed by a RX data processor 1342 to extract the reverse link message transmitted by the second device 1350. The processor 1330 then determines which precoding matrix to use for determining the beam-forming weights then processes the extracted message.

FIG. 13 also illustrates that the communication components may include one or more components that perform access control operations as taught herein. For example, an access control component 1390 may cooperate with the processor 1330 and/or other components of the device 1310 to send/receive signals to/from another device (e.g., device 1350) as taught herein. Similarly, an access control component 1392 may cooperate with the processor 1370 and/or other components of the device 1350 to send/receive signals to/from another device (e.g., device 1310). It should be appreciated that for each device 1310 and 1350 the functionality of two or more of the described components may be provided by a single component. For example, a single processing component may provide the functionality of the access control component 1390 and the processor 1330 and a single processing component may provide the functionality of the access control component 1392 and the processor 1370.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 14-24, apparatuses 1400, 1500, 1600, 1700, 1800, 1900, 2000, 2100, 2200, 2300, and 2400 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 14-24 are optional.

The apparatuses 1400, 1500, 1600, 1700, 1800, 1900, 2000, 2100, 2200, 2300, and 2400 may include one or more modules that may perform one or more of the functions described above with regard to various figures. For example, a receiving/sending means 1402 may correspond to, for example, a communication controller as discussed herein. An identifier determining means 1404 may correspond to, for example, an access controller as discussed herein. An allowed service determining means 1406 may correspond to, for example, an access controller as discussed herein. A receiving means 1502 may correspond to, for example, a communication controller as discussed herein. A sending means 1504 may correspond to, for example, an access controller as discussed herein. An identifier determining means 1506 may correspond to, for example, an access controller as discussed herein. A sending means 1602 may correspond to, for example, an access controller as discussed herein. A receiving means 1604 may correspond to, for example, a communication controller as discussed herein. An allowed service determining means 1606 may correspond to, for example, an access controller as discussed herein. A configuring means 1702 may correspond to, for example, a provisioning controller as discussed herein. An obtaining means 1704 may correspond to, for example, an access controller as discussed herein. A receiving means 1706 may correspond to, for example, a communication controller as discussed herein. A determining means 1708 may correspond to, for example, an access controller as discussed herein. An identifier determining means 1802 may correspond to, for example, an provisioning controller as discussed herein. A sending means 1804 may correspond to, for example, a communication controller as discussed herein. An assigning means 1806 may correspond to, for example, an provisioning controller as discussed herein. A receiving means 1902 may correspond to, for example, a provisioning controller as discussed herein. A transmitting means 1904 may correspond to, for example, a communication controller as discussed herein. An identifier determining means 2002 may correspond to, for example, a provisioning controller as discussed herein. A sending means 2004 may correspond to, for example, a communication controller as discussed herein. A receiving means 2102 may correspond to, for example, a communication controller as discussed herein. An access enablement determining means 2104 may correspond to, for example, an access controller as discussed herein. A configuration-based determining means 2106 may correspond to, for example, an access controller as discussed herein. A list maintaining means 2108 may correspond to, for example, an access controller as discussed herein. A configuring means 2202 may correspond to, for example, a provisioning controller as discussed herein. A transmitting means 2204 may correspond to, for example, a communication controller as discussed herein. A receiving means 2206 may correspond to, for example, a communication controller as discussed herein. A sending means 2208 may correspond to, for example, a provisioning controller as discussed herein. A defining means 2210 may correspond to, for example, a provisioning controller as discussed herein. A monitoring means 2302 may correspond to, for example, a receiver as discussed herein. A beacon receiving means 2304 may correspond to, for example, a receiver as discussed herein. A sending means 2306 may correspond to, for example, a communication controller as discussed herein. A roaming list receiving means 2308 may correspond to, for example, a provisioning controller as discussed herein. A configuring means 2402 may correspond to, for example, a provisioning controller as discussed herein. A beacon receiving means 2404 may correspond to, for example, a receiver as discussed herein. A sending means 2406 may correspond to, for example, a communication controller as discussed herein. An authorization receiving means 2408 may correspond to, for example, an access controller as discussed herein. A prompting means 2410 may correspond to, for example, an access controller as discussed herein. A displaying means 2412 may correspond to, for example, an access controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of selecting wireless communication service, comprising:
    selecting a first set of system resources; and
    communicating a message to acquire access to the first set of system resources, wherein the message conceals that an access terminal is capable of communication with a second set of system resources.

2. The method of claim 1, further comprising determining that a preferred service is not available from the second set of system resources.

3. The method of claim 2, further comprising:
    requesting registration to the first set of system resources via the second set system of resources for access to a particular type of preferred service; and
    receiving a refusal for registration to the first set of system resources via the second set of system resources for the particular type of preferred service.

4. The method of claim 3, further comprising autonomously releasing a connection associated with the second set of system resources.

5. The method of claim 3, further comprising:
    establishing access to the first set of resources; and
    receiving a handover command that attempts to force service from the second set of system resources.

6. The method of claim 2, wherein the preferred service is a circuit-switched domain service provided by the first set of system resources.

7. The method of claim 6, wherein the preferred service is voice call service on the circuit-switched domain.

8. The method of claim 1, further comprising determining that a preferred service is available from the first set of system resources.

9. The method of claim 1, further comprising autonomously releasing a connection associated with the second set of system resources.

10. The method of claim 1, wherein the first set of system resources comprises circuit-switched network elements, and the second set of system resources comprises packet-switched network elements.

11. The method of claim 1, wherein the second set of system resources is a carrier.

12. The method of claim 11, wherein the first set of system resources constitutes part or all of a system provided by a carrier different from the carrier associated with the second set of system resources.

13. The method of claim 11, wherein the first set of system resources is provided by a carrier of a system using a different radio access technology from the second set of system resources.

14. The method of claim 11, wherein the first set of system resources includes circuit-switched network elements provided by a circuit-switched access network, and the second set of system resources includes packet-switched network elements provided by a packet-switched access network.

15. The method of claim 1, further comprising determining that the second set of system resources does not provide a preferred service, wherein the determination of non-availability of preferred service is based on a failed registration onto a network domain that the preferred service is associated with, and wherein the first set of system resources provides a preferred service associated with a particular type of network domain.

16. The method of claim 1, wherein the first set of system resources comprises a same radio access technology as the second set of system resources.

17. The method of claim 1, wherein the first set of system resources comprises a different radio access technology from the second set of system resources.

18. The method of claim 1, further comprising preventing transfer back to the second set of system resources is based on network knowledge of the second set of system resources not being able to provide a preferred service.

19. A device comprising:
    a transceiver configured to transmit and receive wireless signals;
    a controller; and
    non-transitory computer readable memory storing code that when executed by the controller is configured to communicate a message using the transceiver to acquire access to a first set of system resources, wherein the message conceals that an access terminal is capable of communication with a second set of system resources.

20. The device of claim 19, wherein the non-transitory computer readable memory further comprises code that when executed by the controller is configured to determine that a preferred service is not available from the second set of system resources.

21. The device of claim 20, wherein the non-transitory computer readable memory further comprises code that when executed by the controller is configured to:
    request registration to the first set of system resources via the second set system of resources for access to a particular type of preferred service; and receive a refusal for registration to the first set of system resources via the second set of system resources for the particular type of preferred service.

22. The device of claim 21, wherein the non-transitory computer readable memory further comprises code that when executed by the controller is configured to autonomously release a connection associated with the second set of system resources.

23. The device of claim 21, wherein the non-transitory computer readable memory further comprises code that when executed by the controller is configured to:
establish access to the first set of resources; and
receive a handover command that attempts to force service from the second set of system resources.

24. The device of claim 19, wherein the non-transitory computer readable memory further comprises code that when executed by the controller is configured to determine that a preferred service is available from the first set of system resources.

25. The device of claim 19, wherein the non-transitory computer readable memory further comprises code that when executed by the controller is configured to autonomously release a connection associated with the second set of system resources.

26. The device of claim 19, wherein the first set of system resources comprises circuit-switched network elements, and the second set of system resources comprises packet-switched network elements.

27. The device of claim 19, wherein the non-transitory computer readable memory further comprises code that when executed by the controller is configured to determine that the second set of system resources does not provide a preferred service, wherein the determination of non-availability of preferred service is based on a failed registration onto a network domain that the preferred service is associated with, and wherein the first set of system resources provides a preferred service associated with a particular type of network domain.

28. A computer program product comprising a non-transitory machine readable medium having machine executable instructions stored thereon, that when executed by a computing device are configured to communicate a message using a transceiver to acquire access to a first set of system resources, wherein the message conceals that an access terminal is capable of communication with a second set of system resources.

29. A machine readable medium of claim 28, further comprising machine executable instructions stored thereon, that when executed by a computing device are configured to determine that a preferred service is not available from the second set of system resources.

30. The computer program product of claim 28, further comprising machine executable instructions stored thereon, that when executed by a computing device are configured to determine that a preferred service is available from the first set of system resources.

31. The computer program product of claim 28, further comprising machine executable instructions stored thereon, that when executed by a computing device are configured to autonomously release a connection associated with the second set of system resources.

32. The computer program product of claim 28, further comprising machine executable instructions stored thereon, that when executed by a computing device are configured to:
request access to the first set of system resources for a particular type of preferred service; and
receive a refusal for access to the first set of system resources for the particular type of preferred service.

33. The computer program product of claim 32, further comprising machine executable instructions stored thereon, that when executed by a computing device are configured to:
establish access to the first set of resources; and
receive a handover command that attempts to force service from the second set of system resources.

34. The computer program product of claim 28, wherein the first set of system resources comprises circuit-switched network elements, and the second set of system resources comprises packet-switched network elements.

35. The computer program product of claim 28, further comprising machine executable instructions stored thereon, that when executed by a computing device are configured to determine that the second set of system resources does not provide a preferred service, wherein the determination of non-availability of preferred service is based on a failed registration onto a network domain that the preferred service is associated with, and wherein the first set of system resources provides a preferred service associated with a particular type of network domain.

36. A device comprising:
means for selecting a first set of system resources; and
means for communicating a message to acquire access to the first set of system resources, wherein the message conceals that an access terminal is capable of communication with a second set of system resources.

37. The device of claim 36, further comprising means for determining that a preferred service is not available from the second set of system resources.

38. The device of claim 36, further comprising means for determining that a preferred service is available from the first set of system resources.

39. The device of claim 36, further comprising means for autonomously releasing a connection associated with the second set of system resources.

40. The device of claim 36, further comprising:
means for requesting access to the first set of system resources for a particular type of preferred service; and
means for receiving a refusal for access to the first set of system resources for the particular type of preferred service.

41. The device of claim 36, further comprising:
means for establishing access to the first set of resources; and
means for receiving a handover command forcing service from the second set of system resources.

42. The device of claim 36, wherein the first set of system resources comprises circuit-switched network elements, and the second set of system resources comprises packet-switched network elements.

43. The device of claim 36, further comprising means for determining that the second set of system resources does not provide a preferred service, wherein the determination of non-availability of preferred service is based on a failed registration onto a network domain that the preferred service is associated with, and wherein the first set of system resources provides a preferred service associated with a particular type of network domain.

44. The device of claim 36, further comprising means for preventing transfer back to the second set of system resources is based on network knowledge of the second set of system resources not being able to provide a preferred service.

* * * * *